US007551791B2

(12) United States Patent
Poon et al.

(10) Patent No.: US 7,551,791 B2
(45) Date of Patent: Jun. 23, 2009

(54) IMAGE EVALUATION METHOD, IMAGE EVALUATION DEVICE, AND STORAGE MEDIUM HAVING PROGRAM STORED THEREON

(75) Inventors: Eunice Poon, Ontario (CA); Megumi Kanda, Tokyo (JP); Ian Clarke, Ontario (CA)

(73) Assignee: Seiko Epson Corporation, Tokyo (JP)

( * ) Notice: Subject to any disclaimer, the term of this patent is extended or adjusted under 35 U.S.C. 154(b) by 638 days.

(21) Appl. No.: 11/272,754

(22) Filed: Nov. 15, 2005

(65) Prior Publication Data
US 2006/0204120 A1 Sep. 14, 2006

(30) Foreign Application Priority Data
Nov. 16, 2004 (JP) .............................. 2004-332340
Mar. 2, 2005 (JP) .............................. 2005-057450

(51) Int. Cl.
G06K 9/40 (2006.01)
G06K 9/00 (2006.01)
(52) U.S. Cl. ........................................ 382/254; 382/255
(58) Field of Classification Search ................. 382/141, 382/173, 181, 254, 255, 236; 348/208.4
See application file for complete search history.

(56) References Cited
U.S. PATENT DOCUMENTS
5,712,474 A * 1/1998 Naneda .................... 250/208.1
7,119,837 B2 * 10/2006 Soupliotis et al. ......... 348/208.99

FOREIGN PATENT DOCUMENTS
| JP | 11-284944 A | 10/1999 |
| JP | 2002-10179 A | 1/2002 |
| JP | 2002-369125 A | 12/2002 |
| JP | 2003-87442 A | 3/2003 |

OTHER PUBLICATIONS
Y. Yitzhaky, et al., "Identification of Blur Parameters from Motion Blurred Images", Graphical Models and Image Processing vol. 59, No. 5, Sep. 1997, pp. 310-320.
H. R. Wu, et al., "A Generalized Block-Edge Impairment Metric for Video Coding", IEEE Signal Processing Letters vol. 4, No. 11, Nov. 1997, pp. 317-320.

* cited by examiner

Primary Examiner—Yon Couso
(74) Attorney, Agent, or Firm—Sughrue Mion, PLLC

(57) ABSTRACT

In the present invention, an image evaluation method includes: (a) a step of acquiring image information to be evaluated; (b) a step of setting an evaluation area for the acquired image information, the evaluation area being smaller than an area corresponding to the image information; (c) a step of obtaining an individual evaluation on the acquired image information; (d) a step of obtaining another individual evaluation on the acquired image information; and (e) a step of obtaining a comprehensive evaluation based on the individual evaluation and the other individual evaluation. Herein, the individual evaluation is obtained by individually evaluating a predetermined item in the set evaluation area. The other individual evaluation is obtained by individually evaluating another predetermined item.

17 Claims, 15 Drawing Sheets

|  |  |  |
|---|---|---|
| −1 | 0 | 1 |
| −2 | 0 | 2 |
| −1 | 0 | 1 |

Fig. 7A

|  |  |  |
|---|---|---|
| −1 | −2 | −1 |
| 0 | 0 | 0 |
| 1 | 2 | 1 |

Fig. 7B

| P(i−1, j−1)<br>Y(i−1, j−1) | P(i, j−1)<br>Y(i, j−1) | P(i+1, j−1)<br>Y(i+1, j−1) |
|---|---|---|
| P(i−1, j)<br>Y(i−1, j) | P(i, j)<br>Y(i, j) | P(i+1, j)<br>Y(i+1, j) |
| P(i−1, j+1)<br>Y(i−1, j+1) | P(i, j+1)<br>Y(i, j+1) | P(i+1, j+1)<br>Y(i+1, j+1) |

Fig. 7C

IMAGE EVALUATION METHOD, IMAGE EVALUATION DEVICE, AND STORAGE MEDIUM HAVING PROGRAM STORED THEREON

CROSS-REFERENCE TO RELATED APPLICATIONS

This application claims priority on Japanese Patent Application No. 2004-332340 filed Nov. 16, 2004 and Japanese Patent Application No. 2005-57450 filed Mar. 2, 2005, which are herein incorporated by reference.

BACKGROUND OF THE INVENTION

1. Field of the Invention

The present invention relates to image evaluation methods, image evaluation devices, and storage media having programs stored thereon.

2. Description of the Related Art

Various kinds of methods have been proposed for evaluating image information that is generated by a photographic device or the like. For example, there have been proposed a method for evaluating motion blurs (for example, see "Identification of Blur Parameters from Motion Blurred Image," Y. Yizhaky and N. S. Kopeika, GRAPHICAL MODELS AND IMAGE PROCESSING Vol. 59, No. 5, September, pp. 310-320, 1997) and a method for evaluating noise in images occurring from JPEG (Joint Photographic Experts Group) compression (for example, see "A Generalized Block-Edge Impairment Metric for Video Coding," H. R. Wu and M. Yuen, IEEE SIGNAL PROCESSING LETTERS, VOL. 4, NO. 11, NOVEMBER 1997).

These methods have had the problem, however, that the evaluation items are evaluated individually, and it is thus difficult to make an appropriate evaluation from the resulting items alone.

SUMMARY OF THE INVENTION

It is thus an object of the present invention to evaluate image information more appropriately and make the evaluation efficiently as well.

To achieve the foregoing object, a main invention provides the following image evaluation method.

That is, an image evaluation method includes:

(a) a step of acquiring image information to be evaluated;

(b) a step of setting an evaluation area for the acquired image information, the evaluation area being smaller than an area corresponding to the image information;

(c) a step of obtaining an individual evaluation on the acquired image information, the individual evaluation being obtained by individually evaluating a predetermined item in the set evaluation area;

(d) a step of obtaining an other individual evaluation on the acquired image information, the other individual evaluation being obtained by individually evaluating an other predetermined item; and (e) a step of obtaining a comprehensive evaluation based on the individual evaluation and the other individual evaluation.

The features and objects of the present invention other than those described above will become more apparent from the description of this specification when read with reference to the accompanying drawings.

BRIEF DESCRIPTION OF THE DRAWINGS

FIG. 7A is a diagram for explaining a Sobel filter in an X direction for use when generating an edge image;

FIG. 7B is a diagram for explaining a Sobel filter in a Y direction for use when generating an edge image;

FIG. 7C is a diagram for explaining an area of 3×3 pixels with a given pixel P(i, j) at the center, and the luminances Y of the pixels P in this area;

FIG. 8B is a diagram schematically explaining a gradient magnitude a;

Figure 1:
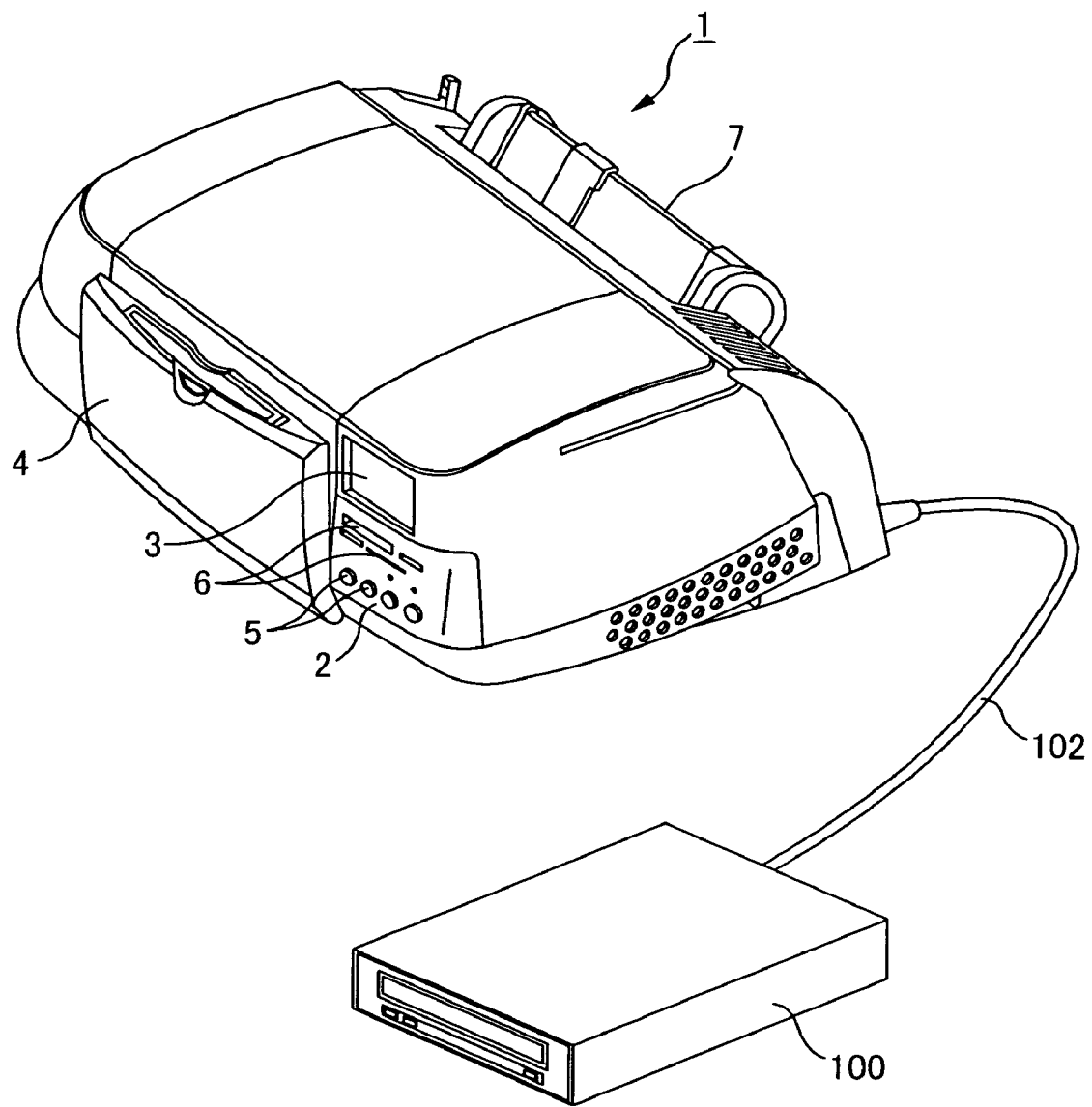
FIG. 1 is a diagram for explaining the appearance of a printer and a CD-R drive connected to this printer.

For a more complete understanding of the present invention and advantages thereof, reference is had to the following description, taken in conjunction with the accompanying drawings.

DETAILED DESCRIPTION OF THE INVENTION

From the description of this specification and that of the accompanying drawings, at least the following will become apparent.

Initially, it will become clear that an image evaluation method descried below can be achieved.

That is, an image evaluation method includes: (a) a step of acquiring image information to be evaluated; (b) a step of setting an evaluation area for the acquired image information, the evaluation area being smaller than an area corresponding to the image information; (c) a step of obtaining an individual evaluation on the acquired image information, the individual evaluation being obtained by individually evaluating a predetermined item in the set evaluation area; (d) a step of obtaining an other individual evaluation on the acquired image information, the other individual evaluation being obtained by individually evaluating an other predetermined item; and (e) a step of obtaining a comprehensive evaluation based on the individual evaluation and the other individual evaluation.

According to such an image evaluation method, the comprehensive evaluation that is obtained provides a more appropriate evaluation since the individual evaluation and the other individual evaluation are reflected thereon. Moreover, since the individual evaluation is made based on an evaluation in the evaluation area, the processing can be performed efficiently.

In the foregoing image evaluation method, it is preferable that in the step of setting the evaluation area, the acquired image information is divided into a plurality of blocks, and the evaluation area is set based on a block having a maximum number of edges.

According to such an image evaluation method, it is possible to improve the accuracy of the individual evaluation.

In the foregoing image evaluation method, it is preferable that in the step of setting the evaluation area, a luminance of each pixel is acquired from the acquired image information, and the evaluation area is set so that a section in which a difference in the luminance of adjacent pixels is largest is located at the center.

According to such an image evaluation method, it is possible to improve the accuracy of the individual evaluation.

In the foregoing image evaluation method, it is preferable that the predetermined item is one selected from between an item indicating a degree of defocus and an item indicating a degree of a motion blur.

According to such an image evaluation method, it is possible to further improve the accuracy of the comprehensive evaluation.

In the foregoing image evaluation method, it is preferable that the other predetermined item includes at least one item out of the item indicating the degree of defocus, the item indicating the degree of a motion blur, and an item indicating a degree of noise occurring at compression time, the at least one item being an item other than the one selected as the predetermined item.

According to such an image evaluation method, it is possible to further improve the accuracy of the comprehensive evaluation.

In the foregoing image evaluation method, it is preferable that the other predetermined item includes two items out of the item indicating the degree of defocus, the item indicating the degree of a motion blur, and the item indicating the degree of noise occurring at compression time, the two items being items other than the one selected as the predetermined item.

According to such an image evaluation method, it is possible to further improve the accuracy of the comprehensive evaluation.

In the foregoing image evaluation method, it is preferable that the other individual evaluation is obtained by individually evaluating the other predetermined item in the set evaluation area.

According to such an image evaluation method, the processing can be performed efficiently since the other individual evaluation is obtained based on an evaluation in the evaluation area.

In the foregoing image evaluation method, it is preferable that in the step of setting the evaluation area, the acquired image information is divided into a plurality of blocks, and the evaluation area is set based on a block having a maximum number of edges.

According to such an image evaluation method, it is possible to improve the accuracy of the other individual evaluation.

In the foregoing image evaluation method, it is preferable that in the step of setting the evaluation area, a luminance of each pixel is acquired from the acquired image information, and the evaluation area is set so that a section in which a difference in the luminance of adjacent pixels is largest is located at the center.

According to such an image evaluation method, it is possible to improve the accuracy of the other individual evaluation.

In the foregoing image evaluation method, it is preferable that in the step of obtaining the comprehensive evaluation, the comprehensive evaluation is obtained based on the individual evaluation and the other individual evaluation given weights, respectively.

According to such an image evaluation method, the comprehensive evaluation that is obtained will provide a more appropriate evaluation.

In the foregoing image evaluation method, it is preferable that in the step of obtaining the comprehensive evaluation, the comprehensive evaluation is obtained based on the individual evaluation and the other individual evaluation given weights, respectively, the weights increasing with increasing impact on image quality.

According to such an image evaluation method, the comprehensive evaluation that is obtained will provide a more appropriate evaluation.

In the foregoing image evaluation method, it is preferable that in the step of obtaining the comprehensive evaluation, the comprehensive evaluation is obtained by using a Gaussian function.

According to such an image evaluation method, it is possible to further improve the accuracy of the comprehensive evaluation.

In the foregoing image evaluation method, it is preferable that the method further includes an evaluation attachment step of attaching the individual evaluation, the other individual evaluation, and the comprehensive evaluation to the acquired image information.

According to such an image evaluation method, it is possible to reflect the evaluation contents in subsequent processing, for example, in the processing by a computer program such as a retouch software application or by a printing apparatus such as a printer.

In the foregoing image evaluation method, it is preferable that the method further includes a step of obtaining an individual evaluation not to be included in the comprehensive evaluation by individually evaluating the acquired image information for a nontarget item that is not to be included in the comprehensive evaluation.

According to such an image evaluation method, it is possible to provide more detailed evaluations.

In the foregoing image evaluation method, it is preferable that in the step of obtaining the individual evaluation not to be included in the comprehensive evaluation, an item indicating a degree of focus on an area different from a subject intended for shooting is evaluated as the nontarget item.

According to such an image evaluation method, it is possible to provide more detailed evaluations.

In the foregoing image evaluation method, it is preferable that the method further includes another evaluation attachment step of attaching the individual evaluation not to be included in the comprehensive evaluation to the acquired image information.

According to such an image evaluation method, it is possible to reflect the evaluation contents in subsequent processing, for example, in processing by a computer program such as a retouch software application or by a printing apparatus such as a printer.

An image evaluation device described below can also be achieved.

That is, an image evaluation device includes: a memory for storing image information to be evaluated; and a controller that performs: a step of acquiring the image information to be evaluated; a step of setting an evaluation area for the acquired image information; a step of obtaining an individual evaluation on the acquired image information, the individual evaluation being obtained by individually evaluating a predetermined item in the set evaluation area; a step of obtaining an other individual evaluation on the acquired image information, the other individual evaluation being obtained by individually evaluating an other predetermined item; and a step of obtaining a comprehensive evaluation based on the individual evaluation and the other individual evaluation.

In the foregoing image evaluation device, it is preferable that: the memory stores image information to be printed as the image information to be evaluated; and the controller further performs a step of attaching the individual evaluation, the other individual evaluation, and the comprehensive evaluation to the image information to be evaluated to generate image information intended for printing.

A storage medium having a program described below can also be achieved.

That is, provided is a storage medium having a program stored thereon, the program including:

a code for making an image evaluation device perform a step of acquiring image information to be evaluated;

a code for making the image evaluation device perform a step of setting an evaluation area for the acquired image information, the evaluation area being smaller than an area corresponding to the image information;

a code for making the image evaluation device perform a step of obtaining an individual evaluation on the acquired image information, the individual evaluation being obtained by individually evaluating a predetermined item in the set evaluation area;

a code for making the image evaluation device perform a step of obtaining an other individual evaluation on the acquired image information, the other individual evaluation being obtained by individually evaluating an other predetermined item; and a code for making the image evaluation device perform a step of obtaining a comprehensive evaluation based on the individual evaluation and the other individual evaluation.

First Embodiment

<Apparatus to which the Image Evaluation Method is Applied>

The image evaluation method of acquiring image information to be evaluated and making evaluations on the image information acquired, thereby obtaining an evaluation result, can be applied to various apparatuses. For example, this method may be applied to a personal computer on which a computer program for image evaluation is installed. This method may also be applied to a variety of apparatuses for handling image information. For example, it may be applied to photographic apparatuses for converting optical images of subjects into image information, and printing apparatuses for printing images onto media based on image information. In this specification, description will be given taking an ink-jet printer (hereinafter, referred to simply as printer), a type of printing apparatus, for instance. More specifically, description will deal with a printer which can evaluate image information to be printed, stored in a memory card or the like (corresponding to a first storage medium), and store the image information and the corresponding evaluation results onto a CD-R or the like (corresponding to a second storage medium).

Printer

<Configuration of Printer 1>

Figure 2:
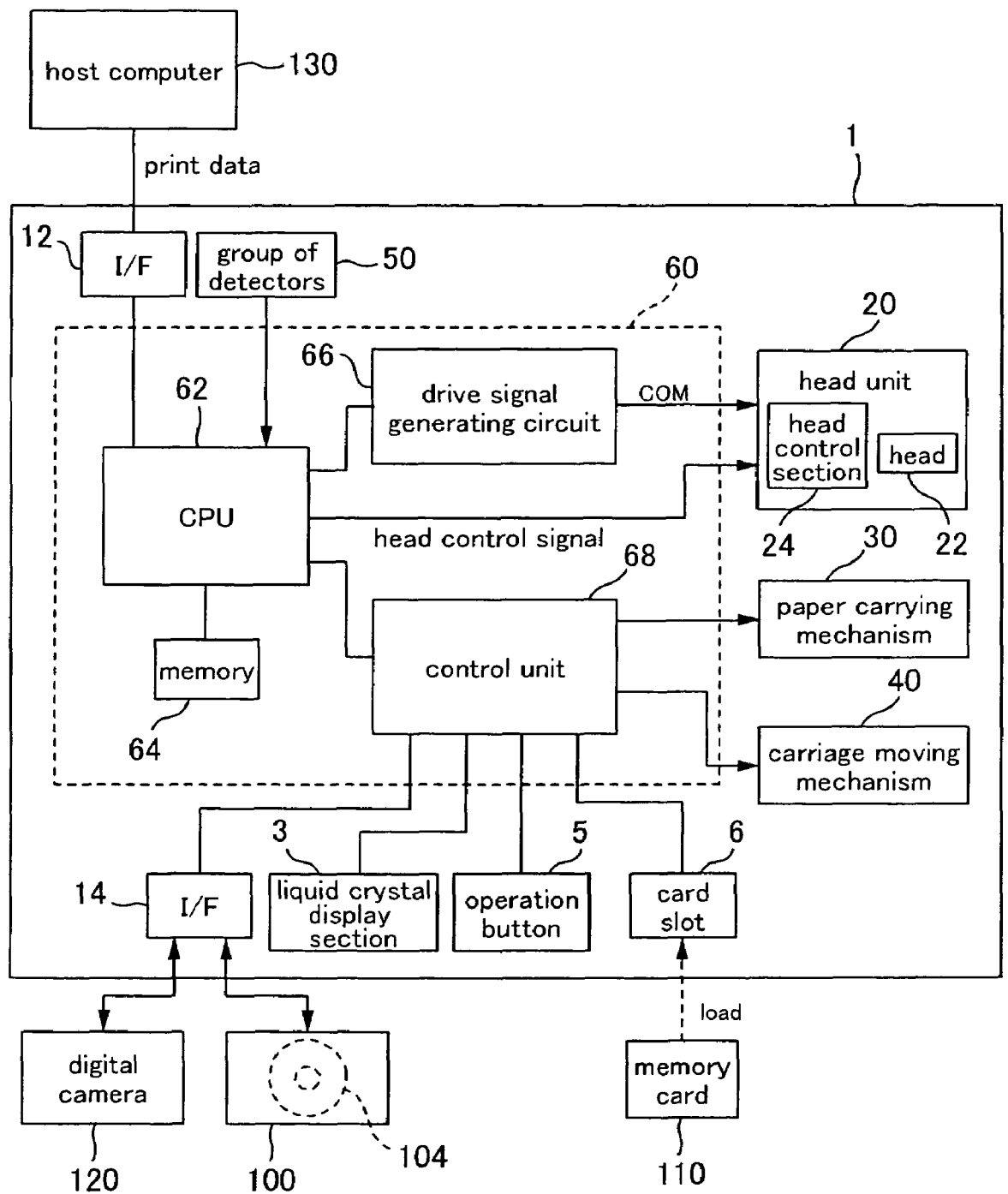
FIG. 2 is a block diagram for explaining the electric configuration of the printer.

Initially, description will be given of the configuration of a printer 1. Here, FIG. 1 is a diagram for explaining the appearance of the printer 1 and a CD-R drive 100 connected to this printer 1. FIG. 2 is a block diagram for explaining the electric configuration of the printer 1.

As shown in FIG. 1, an operation panel 2, a liquid crystal display section 3, and a sheet discharge section 4 are arranged on the front part of the printer 1. The operation panel 2 is provided with various types of operation buttons 5 and card slots 6. The operation buttons 5 are operated when issuing commands to the printer 1. Moreover, the card slots 6 are where a memory card 100 (a card-type flash memory, see FIG. 2) is loaded into. This memory card 110 stores, for example, image information on images that are shot by a digital camera 120. Incidentally, since there are several types of memory cards 110, a plurality of types of card slots 6 are also prepared so that the respective memory cards 110 can be loaded in. The liquid crystal display section 3 is a part for displaying various types of information. This liquid crystal display section 3 is where menus appear and images to be printed are displayed. In the present embodiment, this liquid crystal display section 3 is located above the operation buttons 5. The sheet discharge section 4 is provided with a foldable catch tray. The catch tray is mounted so that its top part can be laid forward. Then, during printing, this catch tray functions as a stage for printed sheets (corresponding to a type of medium) to be put on. Meanwhile, a paper supply section 7 and various types of connectors (not shown) are arranged on the backside of the printer 1. The paper supply section 7 is a part capable of holding a stack of sheets to be printed. The connectors are parts for establishing connection with external devices such as the CD-R drive 100 and the digital camera 120.

In the example of FIG. 1, the CD-R drive 100 is connected to the printer 1 via a cable 102. Incidentally, the connection to the printer 1 is not limited to the cable 102, but may be made by wireless means. This CD-R drive 100 is used when backing up the image information stored in the memory card 110 into a CD-R 104. Moreover, when this CD-R drive 100 is connected to the printer 1, it is possible to print image information stored on a CD (compact disc, not shown) or the CD-R 104.

Next, description will be given of the electric configuration of the printer 1. As shown in FIG. 2, the printer 1 has a head unit 20, a paper carrying mechanism 30, a carriage moving mechanism 40, a group of detectors 50, a printer-side controller 60, the liquid crystal display section 3, the operation buttons 5, and the card slots 6. Aside from these, the printer 1 also has a first interface (I/F) 12 for establishing connection with a host computer 130, and a second interface 14 for establishing connection with the digital camera 120 and the CD-R drive 100.

The head unit 20 is one for ejecting inks toward a sheet, and has a head 22 for ejecting the inks and a head control section 24 for controlling the head 22. This head unit 20 is attached to a carriage (not shown), and is moved in the carriage movement direction (a direction orthogonal to the carrying direction of paper; corresponding to a predetermined direction) by the carriage moving mechanism 40. The paper carrying mechanism 30 corresponds to a medium carrying section for carrying a medium. This paper carrying mechanism 30 is one for feeding a sheet of paper, a medium, into a printable position, and carrying this sheet in the carrying direction by predetermined amounts of carrying. Then, this paper carrying mechanism 30 is composed of, for example, a sheet feed roller, a carrying roller, a carrying motor, and the like (none of which is shown). The carriage moving mechanism 40 is one for moving the carriage having the head unit 20 attached thereto in the carriage movement direction. This carriage moving mechanism 40 is composed of, for example, a carriage motor, a timing belt, pulleys, and the like (none of which is shown). The group of detectors 50 is intended to detect the state of the printer 1. It includes, for example, a linear type encoder for detecting the position of the carriage, a rotary type encoder for detecting the amount of rotation of the carrying roller and the like, and a sheet detector for detecting the presence or absence of sheets (none of which is shown).

The printer-side controller 60 is one for controlling the printer 1. This printer-side controller 60 has a CPU 62, a memory 64, a drive signal generating circuit 66, and a control unit 68. The CPU 62 is a processor for exercising overall control on the printer 1. Then, when storing image information stored in the memory card 110 or the like into the CD-R 104, this CPU 62 makes evaluations on the target image information, and attaches the obtained evaluations to the image information to generate image information for storage (corresponding to the image information intended for printing). The CPU 62 is thus equivalent to a controller for generating the image information for storage. Incidentally, the evaluation and storage of the image information will be detailed later. The memory 64 is intended to secure program-storing areas, work areas, and the like of the CPU 62, and is composed of memory elements such as RAMs, EEPROMs, and ROMs. Then, when making evaluations on image information, the image information to be evaluated is stored in the memory 64. The drive signal generating circuit 66 is one for generating a drive signal for common use. The drive signal generated by this drive signal generating circuit 66 is applied to piezoelectric elements (not shown) of the head 22. Then, the head control section 24 controls the application of the drive signal to the piezoelectric elements based on a head control signal sent from the CPU 62. The control unit 68 is interposed between the individual components to be controlled and the CPU 62, generates drive signals for motors based on commands from the CPU 62, and converts and outputs signals sent from the components in a form interpretable to the CPU 62.

<Operation of the Printer 1>

Figure 3:
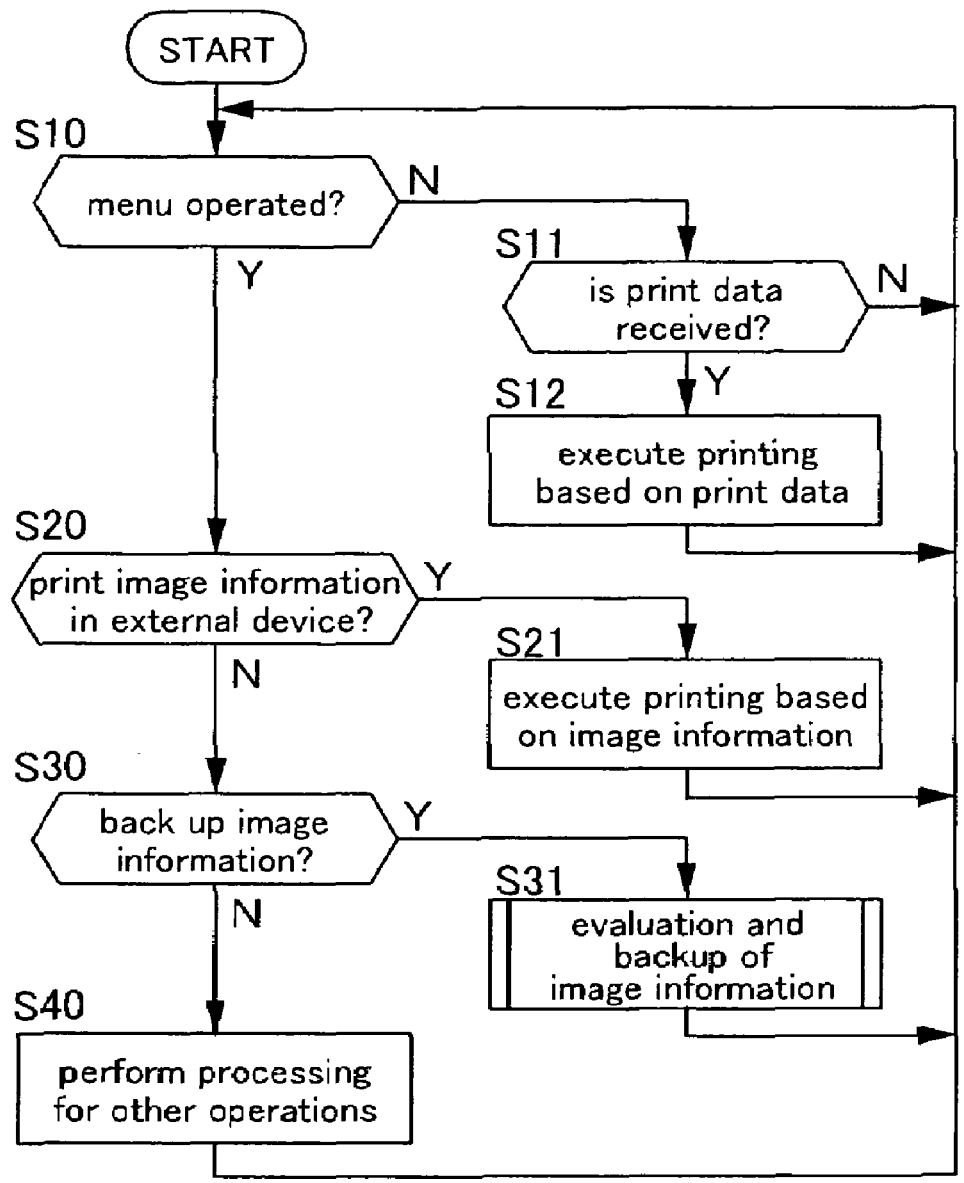
FIG. 3 is a flowchart for explaining the main processing of the printer.

Next, description will be given of the operation of this printer 1. This printer 1 is characterized by the function of backing up image information. Thus, the following description will detail the parts pertaining to the backup of the image information, but state the other parts in a brief way. Here, FIG. 3 is a flowchart for explaining the main processing of the printer 1. Incidentally, these processes are performed by the CPU 62 based on a program stored in the memory 64. For this purpose, the computer program for operating the CPU 62 has codes for realizing these processes.

Description will initially be given of the main processing. In this main processing, a determination is initially made as to whether or not any menu operation is made (S10). For example, in this processing, whether any of the operating buttons 5 is operated or not is determined. Then, if none of the operation buttons 5 is operated, a determination is made whether or not any print data is received from the host computer 130 (S11). Here, if print data is received, printing based on the received print data is executed (S12). That is, inks ejected from the head 22 are landed on a sheet to form an image. If no print data is received or when the printing based on the print data is completed, the processing returns to step S10 to determine whether or not any menu operation is made.

Moreover, at step S10, if it is determined that there is some menu operation, processing corresponding to the content of the operation is performed. In this case, a determination is made as to whether or not the content of the operation instructs to print image information stored in an external device (S20). Here, the external device shall refer to a storage medium separate from the printer 1, storing image information to be printed. For example, it applies to the digital camera 120 and the memory card 110 loaded in a card slot 6. A CD or the CD-ROM 104 loaded into the CD-R drive 100 is also applicable. Incidentally, image information captured by the digital camera 120 is typically in JPEG format, being compressed with a matrix of 8×8 pixels as a single block. Then, if the content of the operation instructs to print the image information stored in the external device, the printing based on this image information is executed (S21).

Moreover, if the content of the operation does not pertain to the printing of the image information stored in the external device, whether or not it instructs to back up the image information is determined (S30). Then, if the content of the operation instructs to back up the image information, processing for storing the image information stored in the memory card 110 (corresponding to the first storage medium) into the CD-R 104 (corresponding to the second storage medium) is performed (S31). Incidentally, in the present embodiment, this backup processing includes evaluating the image information. Then, the backup processing and the processing for evaluating the image information will be detailed later. Moreover, if the content of the operation instructs other processing, the processing corresponding to the content of instruction is performed (S40).

Evaluation and Backup of Image Information

<Overview of the Backup Processing>

Figure 4:
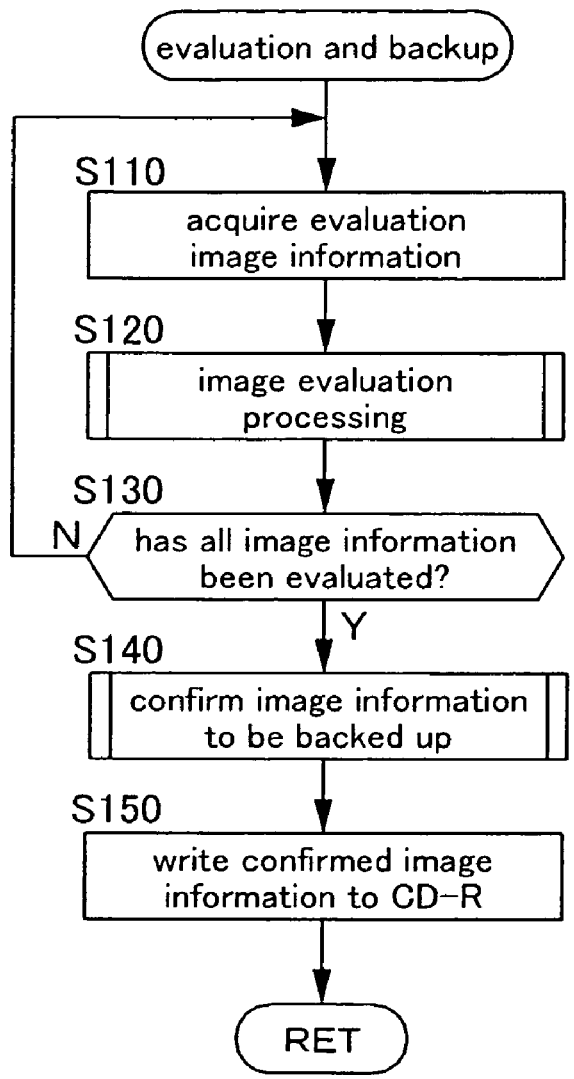
FIG. 4 is a flowchart for explaining evaluation and backup processing (S31) in the main processing.

Next, description will be given of the processing for evaluating image information and the backup processing. Here, FIG. 4 is a flowchart for explaining the evaluation and backup processing (S31) in the main processing, and provides an overview of the processing.

In this processing, evaluation image information is acquired initially (S110). Here, the evaluation image information refers to image information to be evaluated. In this processing, one piece of evaluation image information is selected out of image information to be backed up, and this evaluation image information is stored into the memory 64. Thus, when there are a plurality of pieces of image information to be backed up, one of them is acquired as the evaluation image information. Besides, when there is a single piece of image information to be backed up, that image information is acquired as the evaluation image information. When the evaluation image information is acquired, image evaluation processing is performed (S120). In this image evaluation processing, evaluations are made on a plurality of given items of the evaluation image information, respectively. Then, a comprehensive evaluation is made from the plurality of evaluation results. It should be noted that this image evaluation processing will be described later.

When the evaluations on the evaluation image information are made, a determination is made as to whether or not all the image information has been evaluated (S130). Here, if there is any image information yet to be evaluated, the procedure returns to step S110 to perform the processing described previously. On the other hand, if all the image information has been evaluated, processing for confirming image information to be backed up is performed (S140). In this processing, it is confirmed to the operator whether or not to back up image information that does not satisfy criteria, based on the evaluation results of the image evaluation processing (S120). Then, through this confirmation processing, the image information to be backed up is fixed. It should be noted that this confirmation processing will also be described later. Then, when the image information to be backed up is fixed, the fixed image information is written to the CD-R 104 (S150). In this write processing, the evaluation results (the contents of evaluation) obtained at step S120 are stored along with the image information that has been evaluated. For example, the evaluation results are stored as Exif (exchangeable image file format) accessory information.

Image Evaluation Processing

Figure 5:
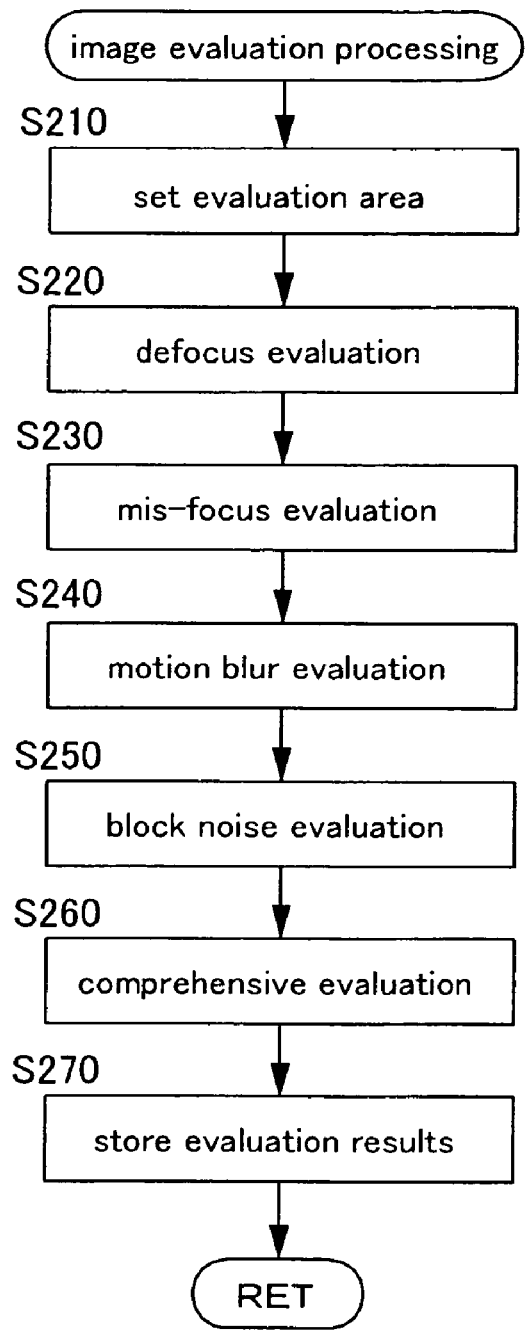
FIG. 5 is a diagram for explaining image evaluation processing (S120) in the backup process.

Next, description will be given in detail of the image evaluation processing (S120) on the acquired evaluation image. Here, FIG. 5 is a flowchart for explaining the image evaluation processing.

The printer 1 of the present embodiment is characterized by this image evaluation processing. That is, a predetermined item of the evaluation image information is initially evaluated on an individual basis, thereby obtaining an individual evaluation. Next, another predetermined item is individually evaluated to obtain another individual evaluation. Furthermore, a comprehensive evaluation is obtained based on the obtained individual evaluation and the other individual evaluations. In short, the characteristic consists in that a plurality of evaluation items are evaluated individually, and a comprehensive evaluation is obtained from the individual evaluation results. Specifically, this image evaluation processing includes the processes of setting an evaluation area (S210), making a defocus evaluation (S220), making a mis-focus evaluation (S230), making a motion blur evaluation (S240), making a block noise evaluation (S250), making a comprehensive evaluation (S260), and storing evaluation results (S270). One of the processes of making a defocus evaluation (S220), a motion blur evaluation (S240), and a block noise evaluation (S250) corresponds to the foregoing individual evaluation, and the two other processes correspond to the other individual evaluations. Incidentally, the mis-focus evaluation (S230) corresponds to an individual evaluation not to be included in the comprehensive evaluation (to be described later).

Hereinafter, description will be given of each of the processes. Incidentally, in the following description, the horizontal direction in an image will be referred to as X direction, and the vertical direction will be referred to as Y direction. Moreover, the horizontal position of a pixel P (see FIG. 6B and the like) has been idiomatically denoted by a symbol i, and the vertical position by a symbol j. Hence, pixels P will be described by using these symbols i and j.

<Setting an Evaluation Area (S210)>

Figure 6A:
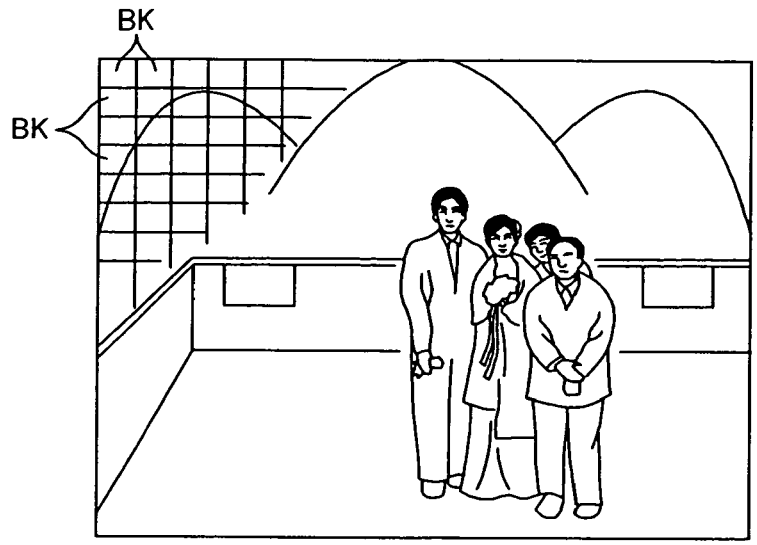
FIG. 6A is a conceptual diagram for explaining image information which is divided into a predetermined number of blocks.
Figure 6B:
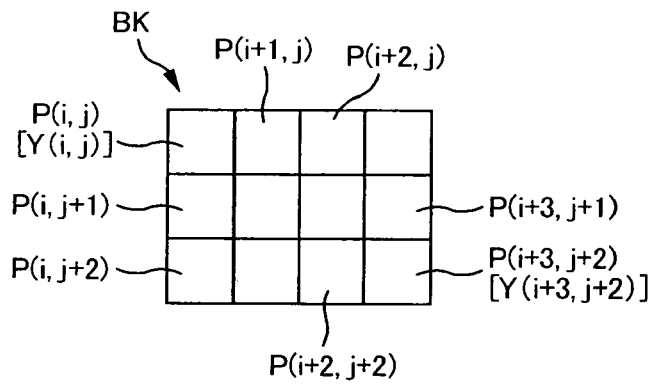
FIG. 6B is a conceptual diagram for explaining differences in luminance between adjoining pixels.
Figure 6C:
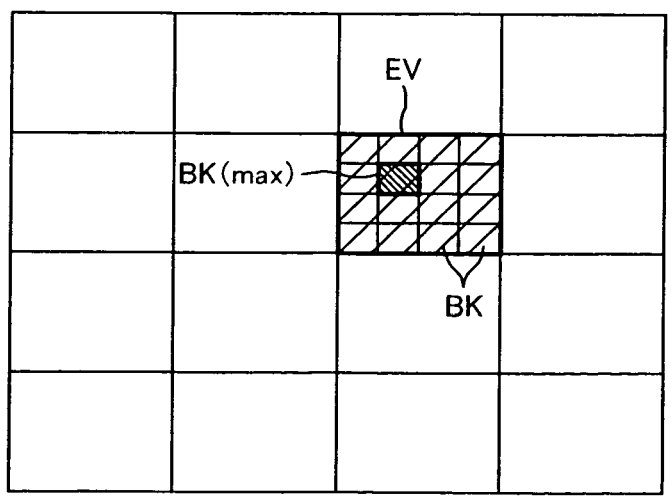
FIG. 6C is a conceptual diagram showing an evaluation area which includes a block having a maximum number of edges.

Initially, description will be given of the process for setting an evaluation area. Here, FIG. 6A is a conceptual diagram for explaining image information which is divided into a predetermined number of blocks BK. FIG. 6B is a conceptual diagram for explaining differences in luminance between adjacent pixels. FIG. 6C is a conceptual diagram showing an evaluation area EV which includes a block BK having a maximum number of edges. It should be noted that the evaluation area EV is the target area of the defocus evaluation (S220) and the motion blur evaluation (S240). In the present embodiment, a portion of the entire area corresponding to the image information is set as an evaluation area EV. This makes it possible to perform the processes of the defocus evaluation (S220) and the motion blur evaluation (S240) efficiently. Then, the evaluation area EV is set based on a block BK that has a maximum number of edges. This makes it possible to improve the accuracy of the defocus evaluation (S220) and the motion blur evaluation (S240).

When setting an evaluation area EV, the CPU 62 generates luminance image information from the evaluation image information. Here, a luminance image is an image composed of luminance Y (information that indicates brightness), not including color information. The luminance image information is information serving as a basis for this luminance image. In the present embodiment, the CPU 62 converts the evaluation image information represented by RGB gradation values into image information expressed in a YIQ color space. Consequently, information on a Y channel for indicating the luminances Y is acquired. Then, the Y-channel information acquired becomes the luminance image information, and an image that is displayed or otherwise processed based on the luminance image information becomes a luminance image.

Next, the CPU 62 divides the entire luminance image information into a plurality of rectangular blocks BK. In the present embodiment, as shown in FIG. 6A, it is divided into 256 blocks BK, or 16 equal parts vertically and 16 equal parts horizontally. Incidentally, for convenience of illustration, FIG. 6A shows blocks BK in some of the entire area. After the division into the blocks BK, the CPU 62 calculates differences in luminance between horizontally adjacent pixels of the luminance image. Then, the absolute values of the differences in luminance are summed up for each of the blocks BK.

Suppose that a single block BK consists of 12 pixels from a top left pixel $P(i, j)$ to a bottom right pixel $P(i+3, j+2)$ as shown in FIG. 6B. In this case, the CPU 62 subtracts the luminance $Y(i, j)$ of the pixel $P(i, j)$ from the luminance $Y(i+1, j)$ of the pixel $P(i+1, j)$ to determine a difference in luminance between these pixels. Similarly, the CPU 62 subtracts the luminance $(i+1, j)$ of the pixel $P(i+1, j)$ from the luminance $Y(i+2, j)$ of the pixel $P(i+2, j)$ to determine a difference in luminance between these pixels. Calculations like this are conducted in succession up to the pair of pixels P(i+3, j+2) and P(i+2, j+2). Then, the absolute values of the differences in luminance are summed up to determine the total difference in luminance of that block BK in the horizontal direction.

After the sums of the horizontal differences in luminance are calculated for the respective blocks BK, the CPU 62 performs the same processing in the vertical direction of the luminance image. That is, differences in luminance between pixels adjacent in the vertical direction are calculated, and the absolute values of the differences in luminance are summed up for each of the blocks BK. With reference to the example of FIG. 6B, differences in luminance between the pixels are calculated in succession from the pair of pixels P(i, j+1) and P(i, j) to the pair of pixels P(i+3, j+2) and P(i+3, j+1), and the absolute values of the luminances are summed up.

Then, when the sums of the differences in luminance (absolute values) of all the blocks BK in the horizontal direction and the vertical direction are determined, the sums of the differences in the horizontal direction and the sums of the differences in the vertical direction are added within the respective blocks BK, thereby determining the sum totals of the differences in luminance in the respective blocks BK. Then, the resulting sum totals of the differences in luminance are compared between the individual blocks BK, thereby identifying the block BK that has the highest sum total. Here, the sums of the differences in luminance in the horizontal direction and the vertical directions are in absolute values. The block BK having the highest sum total of differences in luminance is thus equivalent to a block BK that has the maximum differences in luminance when judged comprehensively in view of the pixels adjacent in the horizontal direction and the pixels adjacent in the vertical direction.

This block BK is considered to be a block BK having a maximum number of edges. For example, in the image information of FIG. 6A, the area of the persons' faces is considered to have largest differences in luminance. Consequently, the block BK corresponding to the portion of the persons' faces is identified as the block BK(max) that has the maximum sum total of differences in luminance.

When the block BK(max) having the maximum sum total of differences in luminance is identified, the CPU 62 sets the evaluation area EV. This evaluation area EV is set to a position such that the block BK(max) having the maximum sum total of differences in luminance is located at the center, and is set to a size into which the size corresponding to the image information is reduced at a predetermined ratio. For example, as shown in FIG. 6C, it is set at a ratio of 0.25 (the size with which the size corresponding to the image information is divided into 16 equal parts). Since the evaluation area EV is thus set so that the block BK having the maximum differences in luminance is located at the center, it is possible to improve the accuracy of the defocus evaluation (S220) and the motion blur evaluation (S240).

<Defocus Evaluation (S220)>

Figure 8A:
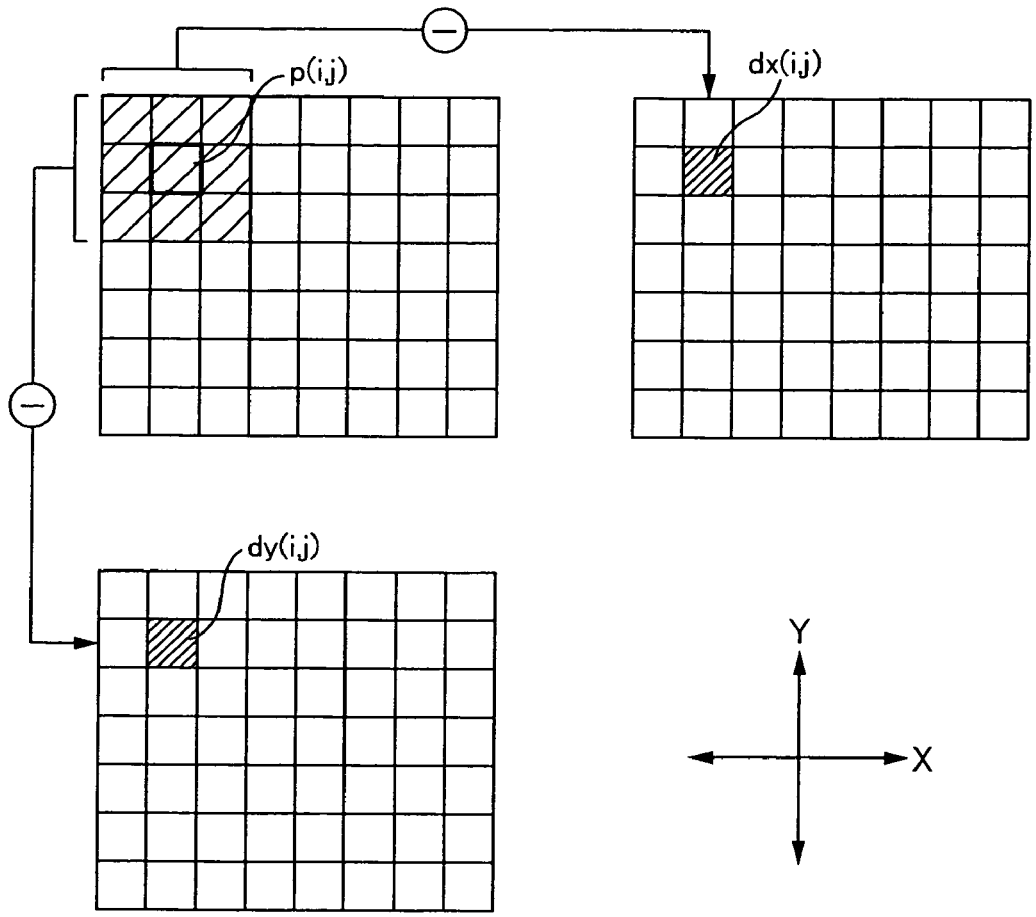
FIG. 8A is a diagram schematically explaining the application of the Sobel filters.
Figure 8B:
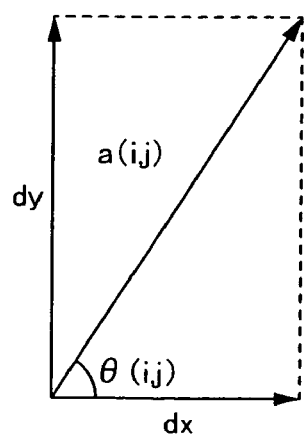
Figure 9A:
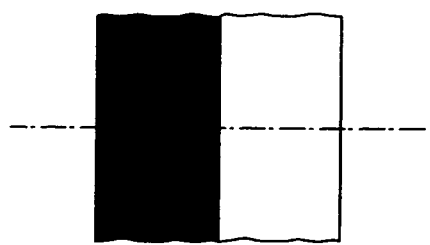
FIG. 9A is a schematic diagram for explaining an image having a sharp edge.
Figure 9C:
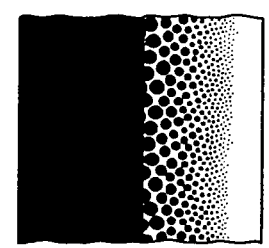
FIG. 9C is a schematic diagram for explaining an image having a blurred edge.
Figure 9B:
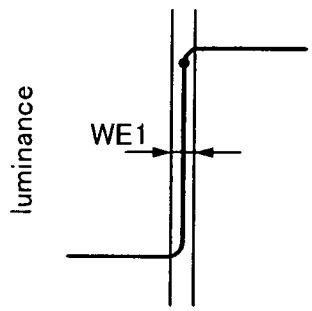
FIG. 9B is a graph of the luminance corresponding to the edge of FIG. 9A.
Figure 9D:
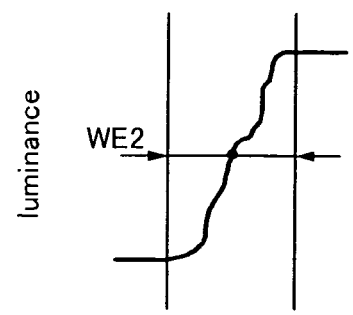
FIG. 9D is a graph of the luminance corresponding to the edge of FIG. 9C.

Now, description will be given of a defocus evaluation. Here, FIG. 7A is a diagram for explaining a Sobel filter in the X direction for use when generating an edge image. FIG. 7B is a diagram for explaining a Sobel filter in the Y direction for use when generating an edge image. FIG. 7C is a schematic diagram for explaining an area of 3×3 pixels with a given pixel P(i, j) at the center, and the luminances Y of the pixels P in this area. FIG. 8A is a diagram schematically explaining the application of the Sobel filters. FIG. 8B is a diagram schematically explaining a gradient magnitude a (to be described later). FIG. 9A is a schematic diagram for explaining an image having a sharp edge. FIG. 9B is a graph of the luminance Y corresponding to the edge of FIG. 9A. FIG. 9C is a schematic diagram for explaining an image having a blurred edge. FIG. 9D is a graph of the luminance Y corresponding to the edge of FIG. 9C.

A defocus evaluation value indicates the degree of defocus. A defocus evaluation is made based on the widths of edges (hereinafter, also referred to as edge widths WE). More specifically, edge widths WE are acquired from pixels P that have high probabilities of forming edges, and then the acquired edge widths WE are averaged (average edge width WEav). Then, the average edge width WEav determined is normalized into a defocus evaluation value. Here, the defocus evaluation value is a kind of individual evaluation value, and is used when determining a comprehensive evaluation value. In terms of evaluation items, the defocus evaluation thus corresponds to an individual evaluation to be included in a comprehensive evaluation. In the present embodiment, the defocus evaluation value takes on integers of 0 to 10. For example, the shaper the focus is, the closer to "0" the value is. The higher the degree of defocus is, the closer to "10" the value is.

This defocus evaluation is made on the image information in the evaluation area EV described above. For this purpose, the CPU 62 initially converts the evaluation image information (RGB gradation values) into YIQ image information. Then, the CPU 62 determines an evaluation area EV of the information on the Y channel for indicating the luminance Y, and generates luminance image information in this evaluation area EV. When the luminance image information in the evaluation area EV is obtained, the Sobel filter in the horizontal direction (X direction) (FIG. 7A) and the Sobel filter in the vertical direction (Y direction) (FIG. 7B) are applied to this luminance image information. The Sobel filters are matrixes having 3×3, nine elements. The application of such Sobel filters produces edge gradients dx and dy (horizontal edge gradients dx and vertical edge gradients dy). In other words, an image that shows pixels P making large changes in luminance Y in the horizontal direction and an image that shows pixels P making large changes in luminance Y in the vertical direction are obtained. In short, a horizontal edge gradient image and a vertical edge gradient image are obtained.

Here, brief description will be given of the application of Sobel filters. For example, applying a Sobel filter to a certain pixel P(i, j) shown in FIG. 7C means that the products of the luminances Y(i−1, j−1) to (i+1, j+1) of the 3×3 pixels P lying in the vicinity of that pixel P and the respective corresponding elements of the Sobel filter are calculated, and the nine products determined are summed up. When the Sobel filer in the X direction is applied to the pixel P(i, j), the edge gradient dx(i, j) resulting from the application is given by the following equation (1):

$$dx(i,j)=[Y(i+1,j-1)+2\times Y(i+1,j)+Y(i+1,j+1)]-[Y(i-1,j-1)+2\times Y(i-1,j)+Y(i-1,j+1)] \quad (1)$$

As a result of application of the Sobel filter in the X direction and the Sobel filter in the Y direction, the horizontal edge gradient dx and the vertical edge gradient dy of the given pixel P(i, j) are determined from this pixel P(i, j) and the eight pixels P surrounding this pixel P(i, j) as shown hatched in FIG. 8A. When the edge gradients dx and dy are determined, the CPU 62 determines the gradient magnitude a(i, j) and the edge direction θ(i, j) for each of the pixels P within the evaluation area EV. Here, the gradient magnitude a(i, j) corresponds to the degree of being an edge. This gradient magnitude a(i, j) is expressed as the magnitude of the vector shown in FIG. 8B, and is calculated based on the following equation (2), for example. Moreover, the edge direction θ(i, j) is the direction determined by the ratio between the horizontal edge gradient dx and the vertical edge gradient dy. That is, as shown in FIG. 8B, the edge direction θ(i, j) is the direction of the sum of the vector of the edge gradient dx and the vector of the edge gradient dy, and is generally orthogonal to a line that is composed of a plurality of adjoining edges.

$$a(i,j)=\sqrt{dx(i,j)^2+dy(i,j)^2} \qquad (2)$$

When the gradient magnitudes a(i, j) and the edge directions θ(i, j) are determined, the CPU 62 classifies the pixels P into horizontal edges and vertical edges based on the respective edge directions θ. Then, the edge widths WE are calculated in the classified directions. In the present embodiment, the edge of a pixel P is classified as horizontal when the edge direction θ is closer to the horizontal direction. The edge of the pixel P is classified as vertical when the edge direction θ is closer to the vertical direction. Specifically, an edge is classified as horizontal when the edge direction θ is below 45°, and is classified as vertical when the edge direction θ is from 45° to 90°. Then, the CPU 62 determines the edge widths WE(i, j) in the classified directions. Here, an edge width WE(i, j) is the distance (i.e., the number of pixels) from a pixel P that is the first to show a maximum luminance Y to a pixel P that is the first to show a minimum luminance Y, being determined within an area including the target pixel P(i, j). For example, the image of FIG. 9A has a sharp edge, and the edge width WE1 is determined to have a sufficiently small value. On the other hand, the image of FIG. 9C has a blurred edge, and the edge width WE2 is determined to have a value greater than the edge width WE1.

After the edge widths WE of the respective pixels P in the evaluation area EV are determined in this way, the CPU 62 sums up the determined edge widths WE to calculate a total edge width WEa (=ΣWE). Then, this total edge width WEa is divided by the total number of edges Ne to determine an average edge width WEav (=WEa/Ne) per edge. Then, based on the average edge width WEav determined, a defocus evaluation value of "0" to "10" is acquired. For example, possible maximum and minimum values of the average edge width WEav are determined and the range from the minimum value to the maximum value is equally divided to create a correlation table between the average edge width WEav and the defocus evaluation value. This correlation table is stored in the memory 64, for example, and an average edge value WEav determined is applied to the correlation table to acquire a defocus evaluation value.

<Mis-Focus Evaluation (S230)>

Figure 10:
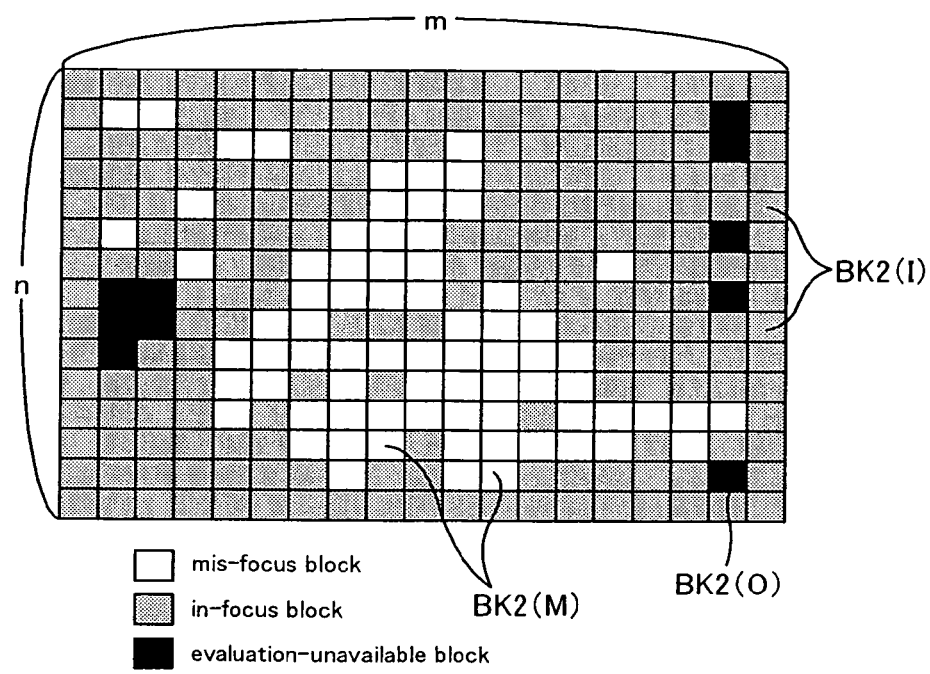
FIG. 10 is a diagram schematically showing classified blocks (BK2)
Figure 11:
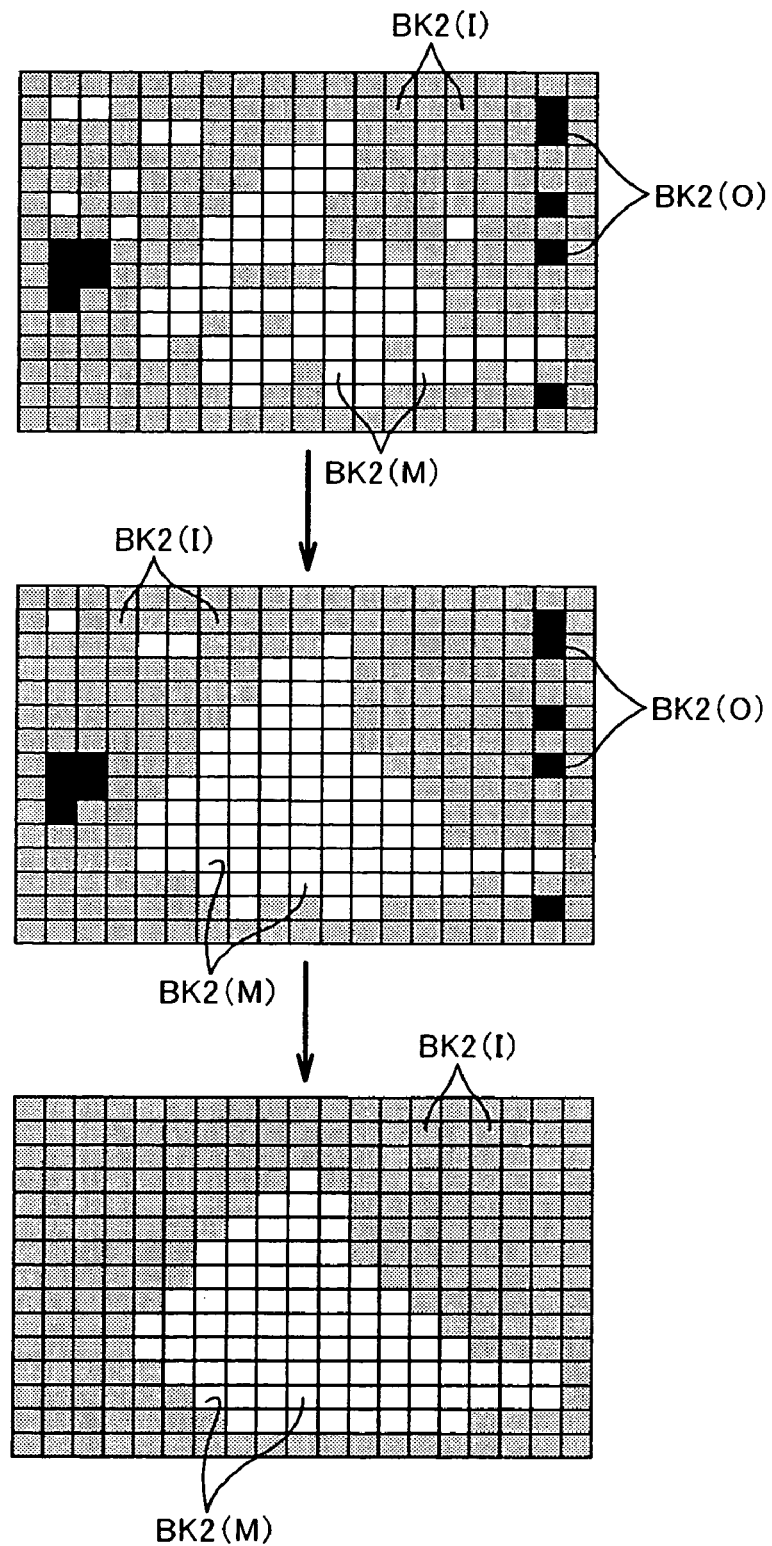
FIG. 11 is a schematic diagram showing stepwise how the blocks are reclassified by object division processing.

Next, description will be given of a mis-focus evaluation. Here, FIG. 10 is a diagram schematically showing classified blocks BK2. Moreover, FIG. 11 is a schematic diagram showing stepwise how the blocks BK2 are reclassified by object division processing.

In this mis-focus evaluation, a comprehensive mis-focus evaluation value MS is determined. This comprehensive mis-focus evaluation value MS shows the degree of mis-focus of the evaluation image. Here, mis-focus refers to the state that an area different from an area intended for shooting is in focus. Hence, the comprehensive mis-focus evaluation value MS indicates the degree of focus on an area different from an area intended for shooting. Incidentally, this comprehensive mis-focus evaluation value MS is not used for a comprehensive evaluation (S260). The reason is that whether mis-focus or not depends largely on the subjective view of the photographer. Consequently, in terms of evaluation items, mis-focus corresponds to a nontarget item not to be included in the comprehensive evaluation.

A mis-focus evaluation is made on the entire evaluation image information. For this purpose, the CPU 62 obtains luminance image information from YIQ information which is obtained by converting the evaluation image information. When the luminance image information is obtained, the CPU 62 applies the horizontal Sobel filter (FIG. 7A) and the vertical Sobel filter (FIG. 7B) to this luminance image information, thereby obtaining a horizontal edge gradient image and a vertical edge gradient image. When these edge gradient images are obtained, the magnitudes a(i, j) of the edge gradients and the edge directions θ(i, j) are determined based on the edge gradients dx and dy. Next, the CPU 62 classifies the pixels P into horizontal edges and vertical edges based on the edge directions θ determined. Then, the edge widths WE in the classified directions are calculated. Incidentally, since these processes are the same as the foregoing, description thereof will be omitted.

Next, based on the magnitudes a(i, j) of the edge gradients and the edge widths WE(i, j), the CPU 62 determines pixel mis-focus evaluation values M(i, j) which indicate the degrees of mis-focus of the respective pixels P. As shown by the following equation (3), these pixel mis-focus evaluation values M(i, j) are determined by the ratios between the edge widths WE(i, j) and the magnitudes a(i, j) of the edge gradients. Thus, the greater the magnitudes a(i, j) of the edge gradients are, the smaller the values of the pixel mis-focus evaluation values M(i, j) are. The smaller the edge widths WE(i, j) are, the smaller the values of the pixel mis-focus evaluation values M(i, j) are. This shows that the clearer the edges are, the smaller values the pixel mis-focus evaluation values M(i, j) have.

$$M(i,j)=we(i,j)/a(i,j) \qquad (3)$$

Incidentally, in the present embodiment, when the magnitude a(i, j) of an edge gradient is approximately "0" in value, the pixel mis-focus evaluation value M(i, j) shall be marked with a symbol (for example, asterisk) for indicating that the evaluation is not available. For example, evaluations might become unavailable in areas where the luminance Y changes little. Specifically, pixels P of sky, sea, and the like would apply.

After the pixel mis-focus evaluation values M(i, j) of the respective pixels P are calculated, the CPU 62 divides the luminance image information into m×n blocks BK2. Here, m and n are arbitrary integers. Then, the blocks BK2 for this processing may be identical to the blocks BK for the processing of setting an evaluation area EV (S210), or may be defined independently. After the division into the blocks BK2, the CPU 62 acquires mis-focus evaluation values block by block (for convenience' sake, also referred to as block mis-focus evaluation values M2). These block mis-focus evaluation values M2(m, n) are acquired by extracting maximum values out of the pixel mis-focus evaluation values M(i, j) of the pixels P in the respective blocks BK2.

Next, the CPU 62 classifies the blocks BK2 into mis-focus blocks BK2(M) which are not in focus, and in-focus blocks BK2(I) which are in focus. This classification is achieved by comparing the block mis-focus evaluation values M2(m, n) with a threshold value for block classification. To explain in concrete terms, the CPU 62 reads the block mis-focus evaluation values M2(m, n) and the threshold value for block classification from the memory 64. If block mis-focus evaluation values M2(m, n) are greater than the threshold value for block classification, the CPU 62 classifies those blocks BK2 as mis-focus blocks BK2(M). On the other hand, if smaller than the threshold value for block classification, those blocks BK2 are classified as in-focus blocks BK2(I). By this classification, block classifications (m, n) are obtained. For example, as shown in FIG. 10, the obtained block classifications (m, n) include mis-focus blocks BK(M), in-focus blocks BK2(I), and evaluation-unavailable blocks BK2(O). Incidentally, the evaluation-unavailable blocks BK2(O) refer to blocks BK2 in which the pixel mis-focus evaluation values M(i, j) of all the pixels P pertaining to those blocks BK2 show that the evaluations are unavailable.

Next, the CPU 62 performs object division processing. This object division processing is processing for padding discrete in-focus blocks BK2(I) and mis-focus blocks BK2(M) with peripheral blocks so that the same types of blocks are arranged continuously. In the present embodiment, this object division processing is performed based on Bayes' theorem. To give a brief explanation, the CPU 62 calculates posterior probabilities for situations where the individual blocks BK2 are mis-focus blocks BK2(M) and posterior probabilities for situations with in-focus blocks BK2(I), in consideration of the classifications of the adjacent blocks BK2. Next, the CPU 62 updates the block classifications with those having higher posterior probability calculations. Then, as shown in FIG. 11, the processing of calculating the posterior probabilities and the processing of updating the block classifications are repeated until all the blocks BK2 are classified into either of in-focus blocks BK2(I) and mis-focus blocks BK2(M).

After the object division processing is performed, the CPU 62 obtains a mis-focus evaluation value on the evaluation image information (for convenience's sake, also referred to as comprehensive mis-focus evaluation value MS) based on the in-focus blocks BK2(I) and the mis-focus blocks BK2 (M). This comprehensive mis-focus evaluation value MS takes on integers of 0 to 10, for example. For example, the lower the possibility of mis-focus an evaluation image has, the closer to "0" the value is. The higher the possibility of mis-focus is, the closer to "10" the value is. Then, this comprehensive mis-focus evaluation value MS is determined based on the numbers of in-focus blocks BK2(I) and mis-focus blocks BK2 (M), the ratio between the in-focus blocks BK2(I) and the mis-focus blocks BK2(M), the positions of the mis-focus blocks BK2(M) in the evaluation image information, and so on. These criteria can be selected in various ways. In this example, the higher proportion the mis-focus blocks BK2(M) occupy the evaluation image information at, the higher the comprehensive mis-focus evaluation value MS is made. Moreover, the smaller the number of sides the in-focus blocks BK2(I) are in contact with, out of the top, bottom, right, and left four sides of the evaluation image information, the higher the comprehensive mis-focus evaluation value MS is made. Incidentally, these criteria are just a few examples, and other criteria may also be employed.

<Motion Blur Evaluation (S240)>

Figure 12:
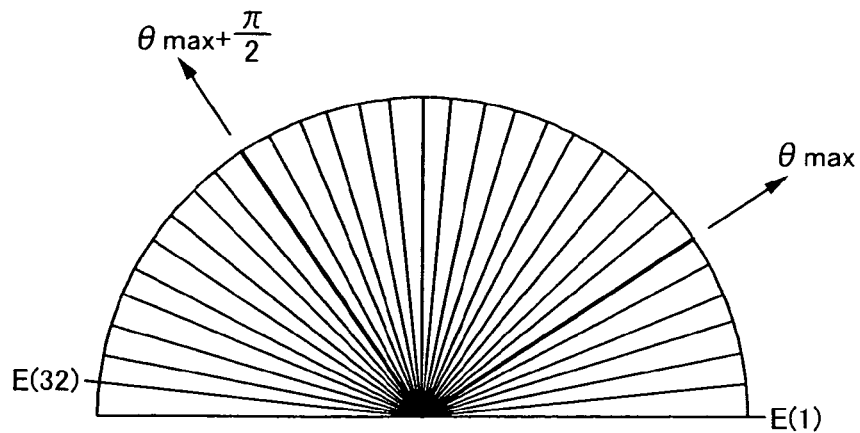
FIG. 12 is a schematic diagram for explaining the relationship between the direction of edge intensity ($\theta$max) and the direction of a motion blur ($\theta$max+$\pi$/2)
Figure 13:
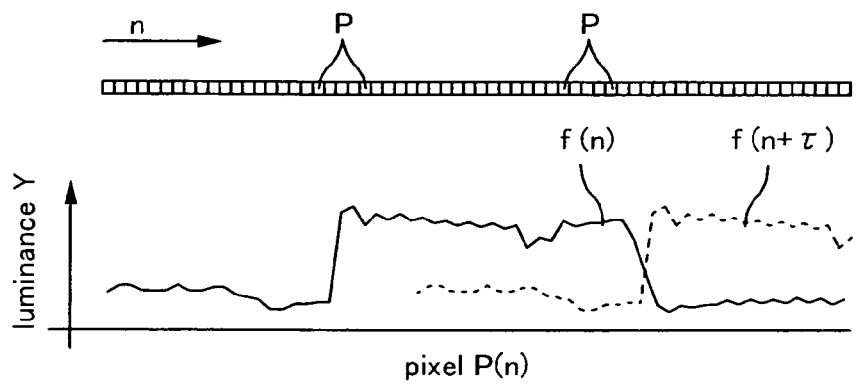
FIG. 13 is a diagram for explaining pixels adjoining in one direction, and a function f(n) obtained from the luminances corresponding to the respective pixels.
Figure 14:
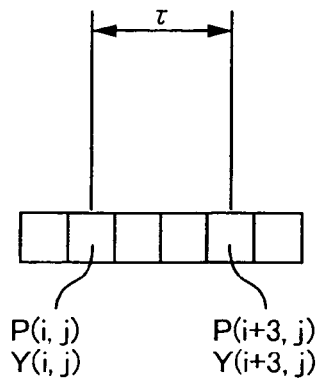
FIG. 14 is a schematic diagram for explaining an autocorrelation function.

Next, description will be given of a motion blur evaluation. Here, FIG. 12 is a schematic diagram for explaining the relationship between the direction of edge intensity ($\theta$max) and the direction of a motion blur ($\theta$max+$\pi$/2). FIG. 13 is a diagram for explaining pixels P adjoining in one direction, and a function f(n) obtained from the luminances Y corresponding to the respective pixels P. FIG. 14 is a schematic diagram for explaining an autocorrelation function.

In this motion blur evaluation, a motion blur evaluation value is determined. This motion blur evaluation value indicates the degree of a motion blur in an evaluation image, and is used when obtaining a comprehensive evaluation. Thus, in terms of evaluation items, the motion blur evaluation corresponds to an individual item to be included in the comprehensive evaluation.

Initially, an overview will be given of the motion blur evaluation. A motion blur refers to a phenomenon that occurs from the movement of the camera during exposure so that the subject is shifted in the direction of movement of the camera. Thus, the motion blur evaluation in the present embodiment indicates the degree of shift of the subject. Initially, the direction of a motion blur ($\theta$max+$\pi$/2) is determined, and a function f(n) between pixels P and luminances Y is obtained in the direction of the motion blur determined. Then, an autocorrelation function ACFk($\tau$) given by the following equation (4) is determined as to the obtained function f(n). The displacement $\tau$ at which this autocorrelation function ACFk($\tau$) takes the minimum value is regarded as the amount of the motion blur.

$$ACFK(\tau) = \frac{1}{N}\sum_{n=0}^{N-1} f(n) \cdot f(n+\tau) \quad (4)$$

That is, when a motion blur occurs, a given point on a subject is captured as a line across the range corresponding to the amount of the motion blur. Since this line is an identical point on the subject, it has high correlativeness in color. The amount of the motion blur can thus be acquired by determining the function f(n) between pixels P and luminances Y in the direction of the motion blur, and calculating the autocorrelation function ACFk($\tau$) while shifting the pixel P in the determined function f(n) in the direction of the motion blur. In short, the displacement $\tau$ at which the autocorrelation function ACFk($\tau$) reaches its minimum is considered to be the amount of the motion blur. Then, the CPU 62 determines the motion blur evaluation value from the amount of the motion blur acquired. This motion blur evaluation value is the normalized amount of the motion blur. That is, the amount of the motion blur is normalized into a motion blur evaluation value. Here, like the defocus evaluation value, the motion blur evaluation values also takes on integers of 0 to 10. For example, the smaller the amount of the motion blur is, the closer to "0" the value is. The greater the amount of the motion blur is, the closer to "10" the value is.

Next, the motion blur evaluation will be described in the concrete. This motion blur evaluation is also made based on the luminances Y in the foregoing evaluation area EV. For this reason, the CPU 62 obtains the luminance image information in the evaluation area EV from the YIQ information that is based on the evaluation image information. Next, the CPU 62 applies the horizontal Sobel filter (FIG. 7A) and the vertical Sobel filter (FIG. 7B) to the luminance image information, thereby obtaining a horizontal edge gradient image dx and a vertical edge gradient image dy. When the edge gradient images dx and dy are obtained, a determination is made as to which angle the edges appear most clearly at in the evaluation area EV. Here, as shown in FIG. 12, the CPU 62 calculates edge intensities E(n) based on the following equation (5) at respective determination angles $\theta$n (n: 1 to 32) on a ½ circle. This equation (5) shows that an edge intensity E(n) is expressed by the sum of the absolute values (ABS) of cos $\theta \cdot$dx+sin $\theta \cdot$dy, and thus is the total sum of the edge gradients in the determination angle $\theta$n.

$$E(n) = \sum_{j}\sum_{i} [\text{ABS}(\cos\theta n \cdot dx(i,j) + \sin\theta n \cdot dy(i,j))] \quad (5)$$

Then, based on the edge intensities E(n) determined, an angle $\theta$max with the highest edge intensity is acquired. This angle θmax can be said to be the direction in which edges appear the most. Supposing that a motion blur has occurred during exposure, edges in the same direction as that of the motion blur are shifted in the same direction as that of the motion blur, thereby becoming blurred. Edges in the direction perpendicular to the direction of the motion blur, however, tend to remain as edges even when shifted in the same direction as that of the motion blur. This means that the angle θmax with the highest edge intensity is the direction perpendicular to that of the motion blur. Consequently, the direction θmax+π/2 perpendicular to this angle θmax can be said to be the same angle as the direction of the motion blur.

When the direction of the motion blur is thus acquired, the CPU 62, as shown in FIG. 13, determines a group of pixels that are in the direction of the motion blur, and determines a function f(n) of the luminance Y from the group of pixels. Next, based on the foregoing equation (4), the CPU 62 determines a autocorrelation function ACFf(τ) between this function f(n) and the function f(n+τ) that is shifted by a displacement τ.

That is, the CPU 62 determines the displacement τ at which the autocorrelation function ACFf(τ) reaches its minimum as the amount of the motion blur. As can be seen from the equation (4), the autocorrelation function ACFk(τ) is obtained by calculating the product of the original function f(n) and the function f(n+τ), which is a function shifted by a displacement τ, for each of N pixels (i.e., pixels n=0 to N−1), and averaging the same (1/N). Assuming here that the displacement τ is zero, the autocorrelation function ACFk(τ) reaches its maximum since the pixels of the function f(n) coincide with the pixels of the function f(n+τ), respectively. Then, as the displacement τ is increased like 1, 2, . . . , the function f(n+τ) deviates from the function f(n). This lowers the degree of coincidence between the pixels of the function f(n) and the pixels of the function f(n+τ). As a result, the autocorrelation function ACFk(τ) also decreases each time the displacement τ increases. Then, when a displacement τ corresponding to the amount of the motion blur is set, as shown by the dotted line in FIG. 13, the autocorrelation function ACFk(τ) takes its minimum value since the function f(n+τ) and the function f(n) do not overlap any longer. If the displacement τ is increased further, the correlation between the function f(n) and the function f(n+τ) disappears, so that the autocorrelation function ACFk(τ) can exhibit higher values, but unstable, than the foregoing minimum value.

For example, as shown in FIG. 14, when a motion blur occurs over three pixels in the horizontal direction, the luminances Y of those pixels, from a pixel P(i, j) to the third pixel P(i+3, j) from that pixel, show similar values. In this case, if a displacement τ of four (pixels) is given, the blurred portion of the function f(n) and the blurred portion of the function f(n+τ) no longer overlap with each other, and the autocorrelation function ACFf(τ) takes a minimum value. Consequently, the displacement τ that yields the lowest value of the autocorrelation function ACFf(τ) can be said to indicate the amount of the motion blur.

Incidentally, for the sake of improved accuracy in detecting the amount of the motion blur, a plurality of sample lines may be determined so that the amount of a motion blur is acquired based on the autocorrelation functions ACFk(τ) determined on the respective sample lines. This makes it possible to acquire the amount of a motion blur accurately in such cases that the motion blur occurs along a circular track.

When the amount of the motion blur is thus determined, the CPU 62 acquires a motion blur evaluation value of "0" to "10" based on the amount of the motion blur determined. For example, possible maximum and minimum values of the amount of a motion blur are determined, and the range from the minimum value to the maximum value is equally divided to create a correlation table between the amount of a motion blur and the motion blur evaluation value. This correlation table is stored in the memory 64, for example, and the amount of a motion blur determined is applied to the correlation table to acquire a motion blur evaluation value.

<Block Noise Evaluation (S250)>

Figure 15:
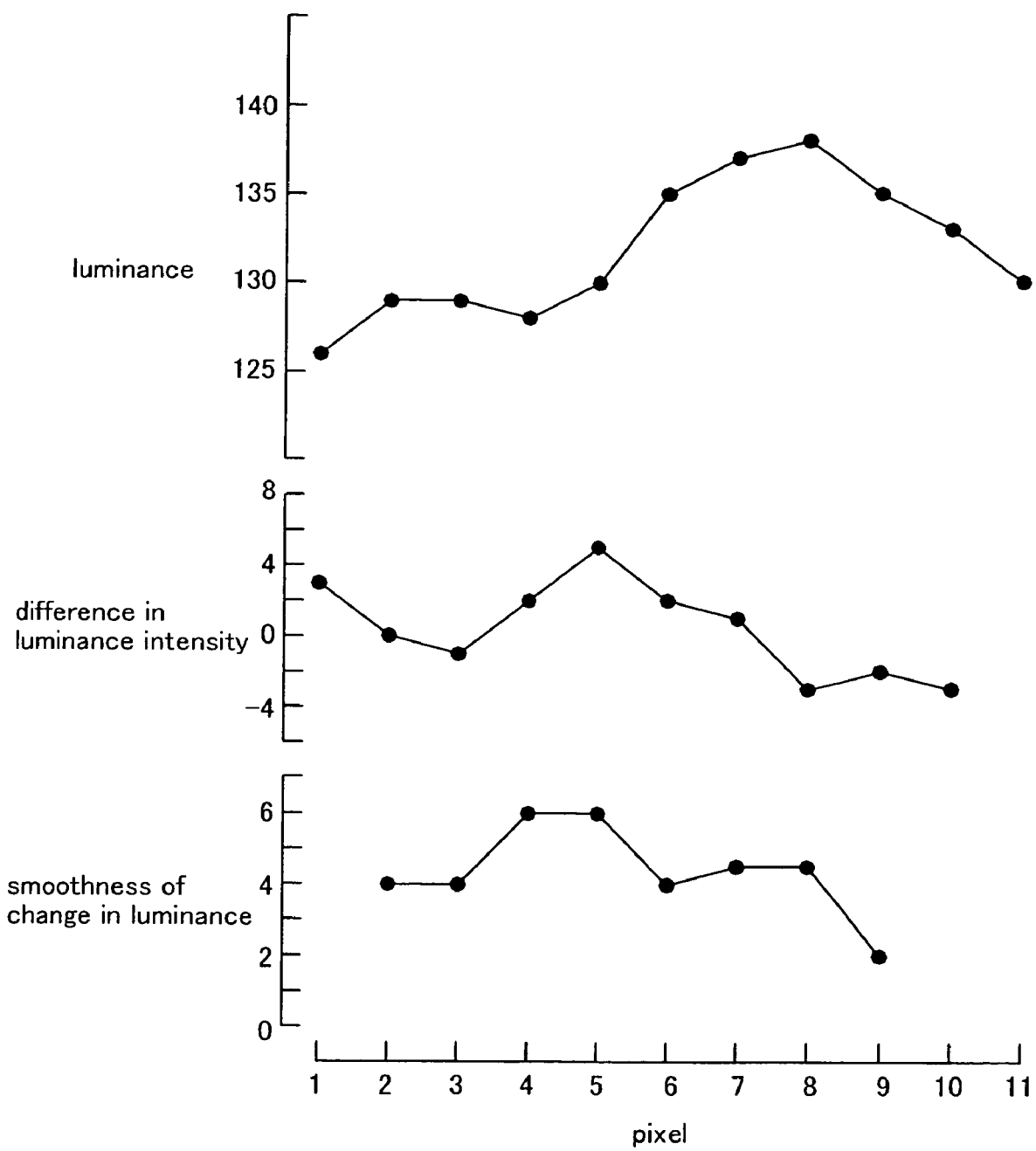
FIG. 15 is an explanatory diagram showing an example of luminance, differences in the intensity of luminance, and the smoothness of changes in luminance.

Next, description will be given of a block noise evaluation. Here, FIG. 15 is an explanatory diagram showing an example of luminance Y, differences in the magnitude of luminance Y, and the smoothness of changes in luminance Y.

Initially, description will be given of block noise. Block noise refers to differences in luminance Y that can occur from block borders due to JPEG compression. Incidentally, as employed here, a "block" refers to each single unit of JPEG compression. In the block noise evaluation, a block noise evaluation value is determined. This block noise evaluation value indicates the degree of noise occurring from block borders, i.e., the degree of noise occurring at compression time. For example, the block noise evaluation value takes on integers of 0 to 10. For example, the lower degree of block noise the evaluation image information has, the closer to "0" the value is. The higher the degree is, the closer to "10" the value is. This block noise evaluation value is also used when obtaining a comprehensive evaluation. Thus, in terms of evaluation items, block noise corresponds to an individual item to be included in the comprehensive evaluation.

A block noise evaluation is made on the entire evaluation image information. For this reason, the CPU 62 obtains the luminance image information from the YIQ information that is based on the evaluation image information. When the luminance image information is obtained, the CPU 62 calculates differences in luminance between individual pixels in the horizontal direction and the vertical direction from this luminance image information. Since this method for calculating differences in luminance is the same as the one described in the setting of an evaluation area (S210), description thereof will be omitted. When the differences in luminance are determined, the smoothness of changes in the luminances Y of the respective pixels P in the horizontal direction and the smoothness of changes in the luminances Y of the respective pixels P in the vertical direction are calculated based on luminance differences ddx in the horizontal direction and luminance differences ddy in the vertical direction. Here, the smoothness of changes in the luminances Y of pixels P in the horizontal direction shall be represented by horizontal smoothness sx(i, j), and the smoothness of changes in the luminances Y of pixels P in the vertical direction shall be represented by vertical smoothness sy(i, j).

The horizontal smoothness sx(i, j) is given by the following equation (6), and the vertical smoothness sy(i, j) is given by the following equation (7). As can be seen from these equations (6) and (7), the smoothnesses sx and sy among adjoining three pixels P are each expressed as the sum of the absolute value of a value determined by subtracting the luminance difference of the second pixel P from the luminance difference of the first pixel P, and the absolute value of a value determined by subtracting the luminance difference of the third pixel P from the luminance difference of the second pixel P. After the smoothnesses sx and sy are calculated, the CPU 62 calculates an average horizontal smoothness ave (psx) and an average vertical smoothness ave(psy) of the pixels P that fall on the borders of the blocks used in JPEG compression (hereinafter, also referred to as border pixels). The CPU 62 also calculates an average horizontal smoothness ave (nsx) and an average vertical smoothness ave (nsy) of the pixels P other than the border pixels (hereinafter, also referred to as inner pixels).

$$sx(i, j) = \text{ABS}[ddx(i-1, j) - ddx(i, j)] + \text{ABS}[ddx(i, j) - ddx(i+1, j)] \quad (6)$$

$$sy(i, j) = \text{ABS}[ddy(i, j-1) - ddy(i, j)] + \text{ABS}[ddy(i, j) - ddy(i, j+1)] \quad (7)$$

For example, the CPU 62 calculates an average horizontal smoothness ave(psx) of the border pixels by dividing the total sum of sx(x, y) by the number of the same, where x is multiples of 8. The CPU 62 also calculates an average vertical smoothness ave(psy) of the border pixels by dividing the total sum of sx(x, y) by the number of the same, where y is multiples of 8. Moreover, the CPU 62 makes similar calculations on the inner pixels. For example, the CPU 62 calculates an average horizontal smoothness ave(nsx) of changes in the luminances Y of the inner pixels by dividing the total sum of sx(x, y) by the number of the same, where x is other than the multiples of 8. The CPU 62 also calculates an average vertical smoothness ave(nsy) of changes in the luminances Y of the inner pixels by dividing the total sum of sx(x, y) by the number of the same, where y is other than the multiples of 8.

Then, a block noise evaluation value Bh in the horizontal direction is calculated as the ratio of the average horizontal smoothness ave(psx) of the border pixels to the average horizontal smoothness ave(nsx) of the inner pixels [ave (psx)/ave (nsx)]. Similarly, a block noise evaluation value Bv in the vertical direction is calculated as the ratio of the average horizontal smoothness ave(psy) of the border pixels to the average horizontal smoothness ave(nsy) of the inner pixels [ave(psy)/ave(nsy)]. Furthermore, a block noise evaluation value B of the evaluation image information is determined by averaging the block noise evaluation value Bh in the horizontal direction and the block noise evaluation value Bv in the vertical direction. In the present embodiment, the determined value is normalized in the range of 0 to 10, thereby obtaining the block noise evaluation value B. That is, an image without any block noise has a value of 0, and an image having a maximum possible level of block noise has a value of 10.

<Comprehensive Evaluation (S260)>

Figure 16:
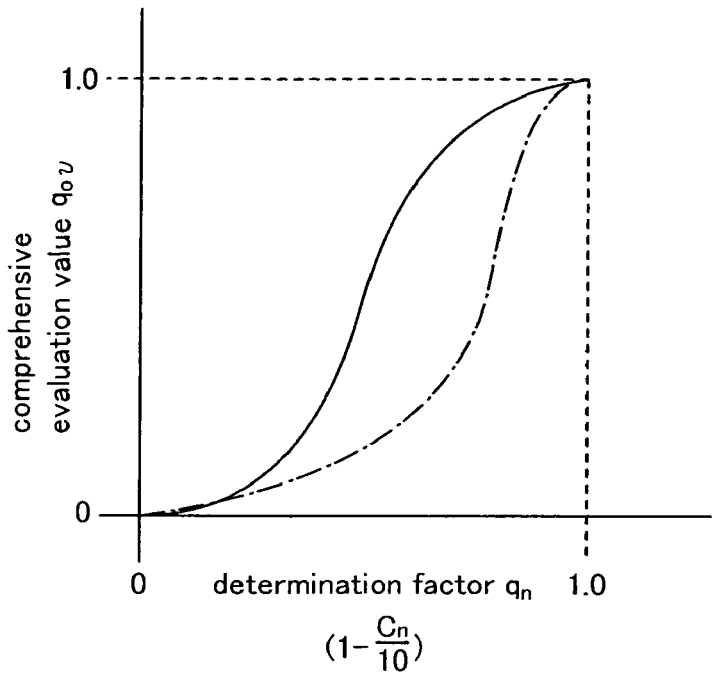
FIG. 16 is a conceptual diagram showing the correlation between a determination factor and a comprehensive evaluation value, showing a variation by weighting.
Figure 17:
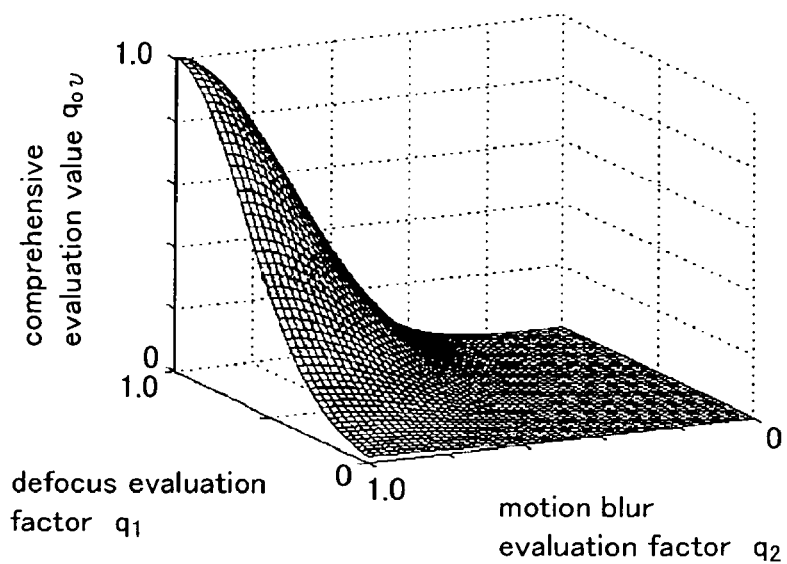
FIG. 17 is a conceptual diagram showing the comprehensive evaluation value when determined based on a defocus evaluation value and a motion blur evaluation value.

Next, description will be given of a comprehensive evaluation. Here, FIG. 16 is a conceptual diagram showing the correlation between a determination factor and a comprehensive evaluation value, showing a variation by weighting. FIG. 17 is a conceptual diagram showing the comprehensive evaluation value when determined based on the defocus evaluation value and the motion blur evaluation value.

A comprehensive evaluation refers to a composite evaluation on image information, being made based on evaluations on two or more items. In this comprehensive evaluation, the items are given respective weights. That is, heavily-weighted items have higher impact on the comprehensive evaluation than lightly-weighted items do. In the present embodiment, the weighting is based on a Gaussian function. This Gaussian function is given by the following equation (8), and generally shows a normal distribution.

$$q_{ov} = k \prod_{n=1}^{N} \exp\left\{-\frac{q_n^2}{2 \times v_n^2}\right\} \quad (8)$$

$$q_1 = 1 - \frac{C_1}{10} \quad (9)$$

$$q_2 = 1 - \frac{C_2}{10} \quad (10)$$

$$q_3 = 1 - \frac{C_3}{10} \quad (11)$$

$$q_{ov} = k \times \exp\left\{-\frac{\left(1 - \frac{C_1}{10}\right)^2}{2 \times v_1^2}\right\} \times \exp\left\{-\frac{\left(1 - \frac{C_2}{10}\right)^2}{2 \times v_2^2}\right\} \times \exp\left\{-\frac{\left(1 - \frac{C_3}{10}\right)^2}{2 \times v_3^2}\right\} \quad (12)$$

In this equation (8), $q_n$ are determination factors which are equivalent to a defocus evaluation factor $q_1$, a motion blur evaluation factor $q_2$, and a block noise evaluation factor $q_3$. Here, the determination factors $q_n$ are normalized in the range of "0" to "1". The closer to "0," the lower image quality they indicate. The closer to "1," the higher image quality they indicate. Thus, the closer to "0" the defocus evaluation factor $q_1$ is, the more it indicates the image is out of focus. The closer to "1," the more it indicates the image is in focus. With the motion blur evaluation factor $q_2$, the closer to "0," the greater it indicates the motion blur is. The closer to "1," the smaller it indicates the motion blur is. With the block noise evaluation factor $q_3$, the closer to "0," the higher it indicates the block noise is. The closer to "1," the lower it indicates the block noise is. Then, the defocus evaluation factor $q_1$, the motion blur evaluation factor $q_2$, and the block noise evaluation factor $q_3$ are determined from the foregoing defocus evaluation value (C1), motion blur evaluation value (C2), and block noise evaluation value (C3) through the conversion processing of the equations (9) to (11). Based on these equations (9) to (11), the equation (8) can be expressed as the equation (12).

In the equation (8), $V_n$ are weighting factors. Then, as shown in the equation (12), these weighting factors $V_n$ are equivalent to a weighting factor $V_1$ for a defocus evaluation, a weighting factor $V_2$ for a motion blur evaluation, and a weighting factor $V_3$ for a block noise evaluation, and are set at values corresponding to the respective items. In the present embodiment, the weighting factor $V_1$ for a defocus evaluation is 0.5, the weighting factor $V_2$ for a motion blur evaluation is 0.3, and the weighting factor $V_3$ for the block noise evaluation is 0.4. The squares of these weighting factors $V_n$ are equivalent to variances $\sigma^2$ in a normal distribution. Consequently, as shown by the solid line in FIG. 16, the greater a weighting factor $V_n$ is, the gentler the curve rises. Moreover, as shown by the dotted line, the smaller the weighting factor $V_n$ is, the sharper the curve rises. This means that the greater the weighting factor $V_n$ is, the higher the impact on the comprehensive evaluation is. For example, given two factors or the defocus evaluation factor $q_1$ and the motion blur evaluation factor $q_2$, a comprehensive evaluation value $q_{ov}$ is determined depending on the respective weights, as shown in FIG. 17.

Based on the same concept, in the present embodiment, the comprehensive evaluation value $q_{ov}$ is determined by the three factors. Here, the weighting factor $V_1$ for a defocus evaluation is the greatest, and the weighting factor $V_3$ for a block noise evaluation is the second. Moreover, the weighting factor $V_2$ for a motion blur evaluation is the smallest. The reason for this is that the impact of defocus on image quality is typically higher than that of block noise on image quality. It is also because the impact of block noise on image quality is higher than that of a motion blur on image quality. Then, the CPU 62 performs the computing of the equation (12) to calculate the comprehensive evaluation value. That is, the comprehensive evaluation value $q_{ov}$ is determined from the defocus evaluation factor $q_1$, the motion blur evaluation factor $q_2$, and the block noise evaluation factor $q_3$.

According to the comprehensive evaluation value $q_{ov}$ determined thus, it is possible to evaluate the evaluation image appropriately. The reasons for this are as follows. First, when the comprehensive evaluation is made from the plurality of evaluation items, the items are given their respective weights. This makes it possible to make an appropriate evaluation. Second, the weights on the respective items are assigned based on the impacts on image quality. That is, since the items having higher impacts on image quality are given higher weights, it is possible to determine the comprehensive evaluation value that shows a more appropriate evaluation. Third, the comprehensive evaluation value $q_{ov}$ is determined by using the Gaussian function. That is, since the comprehensive evaluation value is determined by using the Gaussian function, the comprehensive evaluation value can be calculated with high precision based on the evaluation values of the items and the weights assigned to the respective items.

Besides, in the present embodiment, an evaluation is also made on the item that is not used when determining the comprehensive evaluation value $q_{ov}$ (nontarget item), or namely, on mis-focus. Since the evaluation is also made on the item that is not used when calculating the comprehensive evaluation value, it is possible to provide detailed evaluations to the operator.

<Storing the Evaluation Results (S270)>

Next, the CPU 62 stores the obtained evaluation results into the memory 64 in association with the evaluation image information. Here, the CPU 62 stores the defocus evaluation value, the comprehensive mis-focus evaluation value MS, the motion blur evaluation value, the block noise evaluation value, and the comprehensive evaluation value, accompanied with information for establishing association with the evaluation image information, into the memory 64. For example, information for describing the filename of the evaluation image information is attached for storage. Then, after the evaluation results are stored, the CPU 62 repeats the processes described above until all the images to be backed up are evaluated (S130).

Confirmation of Backup Information

Figure 18:
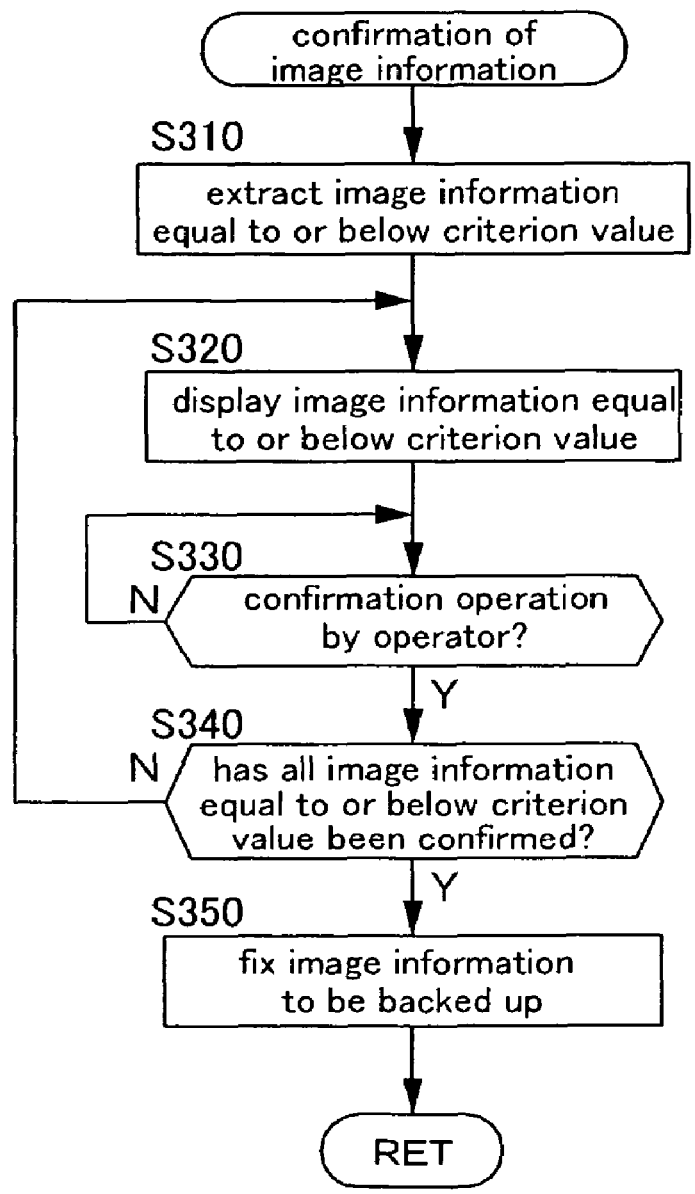
FIG. 18 is a flowchart for explaining processing for confirming image information to be backed up.

Next, description will be given of the processing for confirming the image information to be backed up (S140). Here, FIG. 18 is a flowchart for explaining this confirmation processing.

This confirmation processing is performed after the image evaluation processing (S120). Then, in this confirmation processing, it is confirmed to the user whether or not to back up image information whose comprehensive evaluation value determined is lower than or equal to a criterion value. Here, image information that is confirmed to be backed up is stored into a storage medium such as the CD-R 104, along with the image information whose comprehensive evaluation value exceeds the criterion value (S150).

To make such a confirmation, processing for extracting image information under the criterion value is initially performed in the confirmation processing (S310). In this processing, the CPU 62 refers to the evaluation results stored in the memory 64, and compares the referred evaluation results and the criterion value. Then, image information equal to or below the criterion value is extracted. In the present embodiment, the CPU 62 refers to the comprehensive evaluation value of each piece of image information. Then, if this comprehensive evaluation value is lower than or equal to, e.g., "6," then that piece of image information is extracted as one equal to or below the criterion value. It should be noted that the result of extraction is filename information, for example, and is stored into the memory 64.

Next, the image information equal to or below the criterion value is displayed (S320). Here, in the present embodiment, if there are a plurality of pieces of image information equal to or below the criterion value, only one of the pieces of image information is displayed. The reason for this is that the liquid crystal display section 3 provided on the printer 1 has a limited size, and a thumbnail view can thus make images difficult to identify. In this case, the order of display may be determined arbitrarily. In the present embodiment, images are displayed in order of filename. In general, pieces of image information shot by the digital camera 120 are given serial filenames. Displaying in order of filename is thus advantageously easy for the operator to understand.

When the image information is displayed, a confirmation from the operator is waited (S330). Here, the CPU 62 monitors a signal from the operating section, and determines the presence or absence of a confirmation operation based on this signal. The CPU 62 also identifies whether or not to back up the image information, based on the signal from the operating section. In other words, it acquires confirmation information indicating whether or not to back up. Then, when the confirmation information is acquired, the CPU 62 updates a list of image information to be backed up based on this confirmation information. Then, the CPU 62 checks for image information yet to be confirmed (S340), and if there is image information yet to be confirmed, returns to the processing of step S320 to perform the same processing on the next piece of image information. Moreover, if confirmation has been made on all the image information extracted, the CPU 62 fixes the image information to be backed up (S350).

When the image information to be backed up is fixed, the fixed image information is written to the CD-R 104 (S150). Here, the CPU 62 attaches the information on the individual evaluation values obtained by the image evaluation processing to the image information to be backed up, thereby generating image information intended for writing (corresponding to the image information for storage). In the present embodiment, comprehensive evaluation values, as well as defocus evaluation values, motion blur evaluation values, and noise block evaluation values which are used to determine the same, are attached to the image information. In addition, comprehensive mis-focus evaluation values MS, which are not used when determining the comprehensive evaluation values, are also attached. For example, when the image information is Exif-compatible, these pieces of information are stored as Exif accessory information. Moreover, if not Exif-compatible, these pieces of information are stored in the form of attached files of the image information. Then, the generated image information for writing is transferred to the CD-R drive 100 via the cable 102 or the like, and stored into the CD-R 104. Then, step S150 for performing such processing is equivalent to the evaluation attachment step and another evaluation attachment step.

Use of Image Information Backed Up

Figure 19:
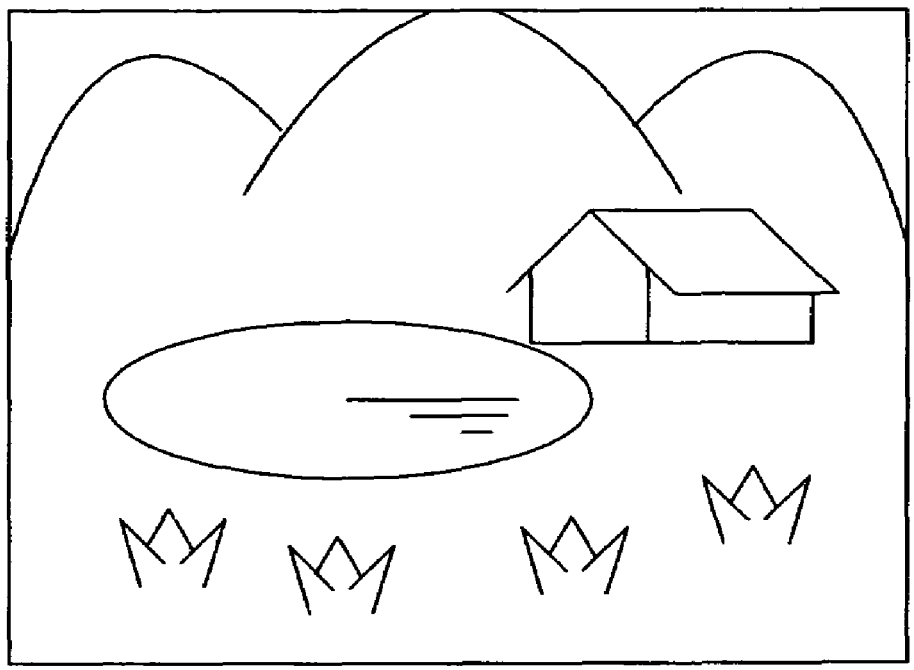
FIG. 19 is a diagram for explaining an example of display of the image information backed up.

Next, description will be given of the use of the image information backed up to the CD-R 104. Here, FIG. 19 is a diagram for explaining an example of display of the image information backed up. This display example is of an image display software application which runs on a personal computer. In the display example shown in FIG. 19, a display area for evaluation items is arranged below a display area for image information. The display area for evaluation items is divided into right and left. The individual evaluations are displayed on the left area, and a comprehensive evaluation and a comment appear on the right area. Since the individual evaluations and the comprehensive evaluation are displayed in this way, the user of this image display software application can be informed of the objective evaluation on this image. Then, this evaluation can be used as auxiliary information when making a determination on printing, correction, etc. Moreover, when the image information is displayed as a thumbnail image, it is preferable to pop up a display image for evaluation items when the mouse cursor or the like is put on the thumbnail image. When such a display mode is adopted, the evaluations on images that are difficult to check for image quality visually, such as thumbnail images, can be favorably checked without magnification or the like. In this case, the CPU of the personal computer functions as a controller which provides a pop-up display for displaying the evaluation results attached to the corresponding image information based on designated position information for indicating the position designated with the mouse cursor or the like.

Moreover, since the evaluation results are attached to the image information, these evaluation results are accessible to the printing apparatus. The image information can thus be printed after correction. This makes it possible to improve the printing quality with no special operation.

Other Embodiments

The foregoing embodiment has dealt with the printer 1 as a printing apparatus. This embodiment, however, has been given in order to facilitate the understanding of the present invention, not to limit the interpretation of the present invention. It is understood that modifications and changes may be made without departing from the gist of the present invention, and all such equivalents are intended to fall within the scope of the present invention. In particular, embodiments to be described below shall also be covered by the present invention.

First, in the foregoing embodiment, the storage medium for storing the image information to be backed up (corresponding to the first storage medium) is not limited to the memory card 110. For example, a hard disk drive of the host computer 130 and a flexible disk loaded into this host computer 130 are also applicable. Similarly, the storage medium for image information to be backed up to (corresponding to the first storage medium) is not limited to the CD-R 104. For example, a magneto-optic disk may be used. In this case, the printer 1 is connected with an magneto-optic disk drive (not shown). Moreover, the apparatus for making an image evaluation is not limited to the printer 1. For example, it may be a personal computer on which a retouch software application (image processing software application) runs. The digital camera 120 is also applicable.

As for the image evaluation procedure, the foregoing embodiment has dealt with the case where evaluations are made on all the image information to be backed up before the image information to be backed up is fixed. Then, backup is performed on the fixed image information. In this respect, evaluations, backup confirmation, and backup may be performed as a set on each piece of image information. Moreover, the evaluation items are not limited to the ones described. Besides, the items from which a comprehensive evaluation is made have only to be plural in number. That is, two may be applicable, and four or more as well.

What is claimed is:

1. An image evaluation method comprising:
   (a) a step of acquiring, by a controller, image information to be evaluated;
   (b) a step of setting, by the controller, an evaluation area for the acquired image information, the evaluation area being smaller than an area corresponding to the image information;
   (c) a step of obtaining, by the controller, an individual evaluation on the acquired image information, the individual evaluation being obtained by individually evaluating a predetermined item in the set evaluation area;
   (d) a step of obtaining, by the controller, an other individual evaluation on the acquired image information, the other individual evaluation being obtained by individually evaluating an other predetermined item; and
   (e) a step of obtaining, by the controller, a comprehensive evaluation based on the individual evaluation and the other individual evaluation,
   wherein:
      the predetermined item is one selected from between an item indicating a degree of defocus and an item indicating a degree of a motion blur; and
      the other predetermined item includes at least one item out of the item indicating the degree of defocus, the item indicating the degree of a motion blur, and an item indicating a degree of noise occurring at compression time, the at least one item being an item other than the one selected as the predetermined item.

2. An image evaluation method according to claim 1, wherein in the step of setting the evaluation area, the acquired image information is divided into a plurality of blocks, and the evaluation area is set based on a block having a maximum number of edges.

3. An image evaluation method according to claim 1, wherein in the step of setting the evaluation area, a luminance of each pixel is acquired from the acquired image information, and the evaluation area is set so that a section in which a difference in the luminance of adjacent pixels is largest is located at the center.

4. An image evaluation method according to claim 1, wherein the other predetermined item includes two items out of the item indicating the degree of defocus, the item indicating the degree of a motion blur, and the item indicating the degree of noise occurring at compression time, the two items being items other than the one selected as the predetermined item.

5. An image evaluation method according to claim 1, wherein the other individual evaluation is obtained by individually evaluating the other predetermined item in the set evaluation area.

6. An image evaluation method comprising:
   (a) a step of acquiring, by a controller, image information to be evaluated;

(b) a step of setting, by the controller, an evaluation area for the acquired image information, the evaluation area being smaller than an area corresponding to the image information;

(c) a step of obtaining, by the controller, an individual evaluation on the acquired image information, the individual evaluation being obtained by individually evaluating a predetermined item in the set evaluation area;

(d) a step of obtaining, by the controller, an other individual evaluation on the acquired image information, the other individual evaluation being obtained by individually evaluating an other predetermined item; and (e) a step of obtaining, by the controller, a comprehensive evaluation based on the individual evaluation and the other individual evaluation, wherein:
the other individual evaluation is obtained by individually evaluating the other predetermined item in the set evaluation area; and in the step of setting the evaluation area, the acquired image information is divided into a plurality of blocks, and the evaluation area is set based on a block having a maximum number of edges.

7. An image evaluation method comprising:

(a) a step of acquiring, by a controller, image information to be evaluated;

(b) a step of setting, by the controller, an evaluation area for the acquired image information, the evaluation area being smaller than an area corresponding to the image information;

(c) a step of obtaining, by the controller, an individual evaluation on the acquired image information, the individual evaluation being obtained by individually evaluating a predetermined item in the set evaluation area;

(d) a step of obtaining, by the controller, an other individual evaluation on the acquired image information, the other individual evaluation being obtained by individually evaluating an other predetermined item; and (e) a step of obtaining, by the controller, a comprehensive evaluation based on the individual evaluation and the other individual evaluation, wherein:
the other individual evaluation is obtained by individually evaluating the other predetermined item in the set evaluation area; and in the step of setting the evaluation area, a luminance of each pixel is acquired from the acquired image information, and the evaluation area is set so that a section in which a difference in the luminance of adjacent pixels is largest is located at the center.

8. An image evaluation method according to claim 1, wherein in the step of obtaining the comprehensive evaluation, the comprehensive evaluation is obtained based on the individual evaluation and the other individual evaluation given weights, respectively.

9. An image evaluation method comprising:

(a) a step of acquiring, by a controller, image information to be evaluated;

(b) a step of setting, by the controller, an evaluation area for the acquired image information, the evaluation area being smaller than an area corresponding to the image information;

(c) a step of obtaining, by the controller, an individual evaluation on the acquired image information, the individual evaluation being obtained by individually evaluating a predetermined item in the set evaluation area;

(d) a step of obtaining, by the controller, an other individual evaluation on the acquired image information, the other individual evaluation being obtained by individually evaluating an other predetermined item; and (e) a step of obtaining, by the controller, a comprehensive evaluation based on the individual evaluation and the other individual evaluation, wherein:
in the step of obtaining the comprehensive evaluation, the comprehensive evaluation is obtained based on the individual evaluation and the other individual evaluation given weights, respectively; and in the step of obtaining the comprehensive evaluation, the comprehensive evaluation is obtained based on the individual evaluation and the other individual evaluation given weights, respectively, the weights increasing with increasing impact on image quality.

10. An image evaluation method according to claim 9, wherein in the step of obtaining the comprehensive evaluation, the comprehensive evaluation is obtained by using a Gaussian function.

11. An image evaluation method according to claim 1, further comprising
an evaluation attachment step of attaching the individual evaluation, the other individual evaluation, and the comprehensive evaluation to the acquired image information.

12. An image evaluation method according to claim 1, further comprising
a step of obtaining an individual evaluation not to be included in the comprehensive evaluation by individually evaluating the acquired image information for a nontarget item that is not to be included in the comprehensive evaluation.

13. An image evaluation method comprising:

(a) a step of acquiring, by a controller, image information to be evaluated;

(b) a step of setting, by the controller, an evaluation area for the acquired image information, the evaluation area being smaller than an area corresponding to the image information;

(c) a step of obtaining, by the controller, an individual evaluation on the acquired image information, the individual evaluation being obtained by individually evaluating a predetermined item in the set evaluation area;

(d) a step of obtaining, by the controller, an other individual evaluation on the acquired image information, the other individual evaluation being obtained by individually evaluating an other predetermined item;

(e) a step of obtaining, by the controller, a comprehensive evaluation based on the individual evaluation and the other individual evaluation; and a step of obtaining, by the controller, an individual evaluation not to be included in the comprehensive evaluation by individually evaluating the acquired image information for a nontarget item that is not to be included in the comprehensive evaluation, wherein in the step of obtaining the individual evaluation not to be included in the comprehensive evaluation, an item indicating a degree of focus on an area different from a subject intended for shooting is evaluated as the nontarget item.

14. An image evaluation method comprising:

(a) a step of acquiring, by a controller, image information to be evaluated;

(b) a step of setting, by the controller, an evaluation area for the acquired image information, the evaluation area being smaller than an area corresponding to the image information;

(c) a step of obtaining, by the controller, an individual evaluation on the acquired image information, the individual evaluation being obtained by individually evaluating a predetermined item in the set evaluation area;

(d) a step of obtaining, by the controller, an other individual evaluation on the acquired image information, the other individual evaluation being obtained by individually evaluating an other predetermined item;

(e) a step of obtaining, by the controller, a comprehensive evaluation based on the individual evaluation and the other individual evaluation;

a step of obtaining, by the controller, an individual evaluation not to be included in the comprehensive evaluation by individually evaluating the acquired image information for a nontarget item that is not to be included in the comprehensive evaluation; and another evaluation attachment step of attaching, by the controller, the individual evaluation not to be included in the comprehensive evaluation to the acquired image information.

15. An image evaluation device comprising:

a memory for storing image information to be evaluated; and a controller that performs:

a step of acquiring the image information to be evaluated;

a step of setting an evaluation area for the acquired image information;

a step of obtaining an individual evaluation on the acquired image information, the individual evaluation being obtained by individually evaluating a predetermined item in the set evaluation area;

a step of obtaining an other individual evaluation on the acquired image information, the other individual evaluation being obtained by individually evaluating an other predetermined item; and a step of obtaining a comprehensive evaluation based on the individual evaluation and the other individual evaluation;

wherein:

the predetermined item is one selected from between an item indicating a degree of defocus and an item indicating a degree of a motion blur; and the other predetermined item includes at least one item out of the item indicating the degree of defocus, the item indicating the degree of a motion blur, and an item indicating a degree of noise occurring at compression time, the at least one item being an item other than the one selected as the predetermined item.

16. An image evaluation device according to claim 15, wherein: the memory stores image information to be printed as the image information to be evaluated; and the controller further performs a step of attaching the individual evaluation, the other individual evaluation, and the comprehensive evaluation to the image information to be evaluated to generate image information intended for printing.

17. A computer-readable medium having a program stored thereon, the program comprising:

a code for making an image evaluation device perform a step of acquiring image information to be evaluated;

a code for making the image evaluation device perform a step of setting an evaluation area for the acquired image information, the evaluation area being smaller than an area corresponding to the image information;

a code for making the image evaluation device perform a step of obtaining an individual evaluation on the acquired image information, the individual evaluation being obtained by individually evaluating a predetermined item in the set evaluation area;

a code for making the image evaluation device perform a step of obtaining an other individual evaluation on the acquired image information, the other individual evaluation being obtained by individually evaluating an other predetermined item; and a code for making the image evaluation device perform a step of obtaining a comprehensive evaluation based on the individual evaluation and the other individual evaluation, wherein:

the predetermined item is one selected from between an item indicating a degree of defocus and an item indicating a degree of a motion blur; and the other predetermined item includes at least one item out of the item indicating the degree of defocus, the item indicating the degree of a motion blur, and an item indicating a degree of noise occurring at compression time, the at least one item being an item other than the one selected as the predetermined item.

* * * * *